United States Patent
Choi et al.

(10) Patent No.: US 12,464,557 B2
(45) Date of Patent: Nov. 4, 2025

(54) METHOD AND APPARATUS FOR TRANSCEIVING DATA BY USING DUAL CONNECTIVITY OF INTEGRATED ACCESS AND BACKHAUL NODE IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Hyunseok Ryu, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 352 days.

(21) Appl. No.: 17/953,810

(22) Filed: Sep. 27, 2022

(65) Prior Publication Data

US 2023/0112386 A1    Apr. 13, 2023

(30) Foreign Application Priority Data

Sep. 27, 2021 (KR) .................. 10-2021-0127553

(51) Int. Cl.
*H04W 72/566* (2023.01)
*H04W 76/15* (2018.01)

(52) U.S. Cl.
CPC ......... *H04W 72/569* (2023.01); *H04W 76/15* (2018.02)

(58) Field of Classification Search
None
See application file for complete search history.

(56) References Cited

U.S. PATENT DOCUMENTS

2020/0084819 A1*  3/2020  Abedini ............... H04W 76/15
2020/0351970 A1* 11/2020  Lee ..................... H04W 76/18
(Continued)

FOREIGN PATENT DOCUMENTS

KR    10-2022-0046968    4/2022
WO    WO 2021/028015    2/2021

OTHER PUBLICATIONS

Nokia et al., "Enhancements for Resource Multiplexing Among IAB Backhaul and Access Links", R1-2106828, 3GPP TSG RAN WG1 #106-e, Aug. 16-27, 2021, 18 pages.
(Continued)

*Primary Examiner* — Khaled M Kassim
*Assistant Examiner* — Ahmed Saifuddin
(74) *Attorney, Agent, or Firm* — The Farrell Law Firm, P.C.

(57) ABSTRACT

The disclosure relates to a 5G or 6G communication system for supporting a higher data transmission rate. Provided is a method of transmitting or receiving data by an integrated access and backhaul (IAB) node in a wireless communication system. The method includes receiving resource allocation information from at least one of a first parent IAB node or a second parent IAB node, with the IAB node having dual connectivity to the at least one of a first parent IAB node and the second parent IAB node, receiving information about first resource scheduling from the first parent IAB node, receiving information about second resource scheduling from the second parent IAB node, and transmitting or receiving data based on the resource allocation information, the information about the first resource scheduling, the information about the second resource scheduling, and a link over the first resource scheduling and the second resource scheduling.

13 Claims, 13 Drawing Sheets

(56) References Cited

U.S. PATENT DOCUMENTS

| | | | |
|---|---|---|---|
| 2022/0116887 A1 | 4/2022 | Choi et al. | |
| 2023/0007565 A1* | 1/2023 | Mildh | H04W 40/24 |
| 2023/0108413 A1* | 4/2023 | You | H04W 72/20 370/329 |
| 2023/0117298 A1* | 4/2023 | Park | H04W 72/20 370/281 |
| 2023/0164617 A1* | 5/2023 | Barac | H04W 76/12 370/328 |
| 2023/0180248 A1* | 6/2023 | Shim | H04L 5/001 |
| 2023/0370943 A1* | 11/2023 | Liu | H04W 40/22 |
| 2024/0298333 A1* | 9/2024 | You | H04W 84/04 |

OTHER PUBLICATIONS

Moderator (AT&T), Feature Lead Summary #3 of 8.10.1, R1-2108279, 3GPP TSG RAN WG1 #106-e, Aug. 16-27, 2021, 56 pages.

Ericsson, "Resource Multiplexing and Dual Connectivity in Enhanced IAB", R1-2108107, 3GPP TSG-RAN WG1 Meeting #106-e, Aug. 16-27, 2021, 21 pages.

Huawei et al., "Resource Multiplexing between Backhaul and Access for IAB Duplexing", R1-2106454, 3GPP TSG RAN WG1 Meeting #106-e, Aug. 16-27, 2021, 12 pages.

International Search Report dated Jan. 12, 2023 issued in counterpart application No. PCT/KR2022/014404, 9 pages.

\* cited by examiner ific application No. 10-2021-0127553, which was filed in the Korean Intellectual Property Office on Sep. 27, 2021, the entire disclosure of which is incorporated herein by reference.

BACKGROUND

1. Field

The disclosure generally relates to a wireless communication system and, more particularly, to a method and apparatus for transmitting or receiving data by using dual connectivity of an integrated access and backhaul (IAB) node.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U)) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below, and provides an apparatus and method for effectively providing services in a mobile communication system.

The disclosure provides various communication schemes that instantly satisfy the half-duplex constraints of the IAB node when an IAB communication system is operated and an IAB node is set up for dual connectivity to multiple parent IAB nodes on a higher level of the IAB node, in an environment where data transmission or reception between distributed units (DUs) of the parent IAB nodes and a mobile termination (MT) of the IAB node and data transmission or reception between a DU of the IAB node and a child IAB MT on a lower level of the IAB node or an access user equipment (UE) may be mixed.

An aspect of the disclosure provides a method of transmitting or receiving data by an IAB node in a wireless communication system, the method including receiving resource allocation information from at least one of a first parent IAB node or a second parent IAB node, with the IAB node having dual connectivity to the first parent IAB node and the second parent IAB node; receiving information about first resource scheduling from the first parent IAB node; receiving information about second resource scheduling from the second parent IAB node; and at least one of transmitting or receiving data based on the received resource allocation information, the information about the first resource scheduling, the information about the second resource scheduling, and a link over the first resource scheduling and the second resource scheduling.

A further aspect of the disclosure provides an IAB node for transmitting or receiving data in a wireless communication system that includes a transceiver and a processor connected to the transceiver and configured to receive resource allocation information from at least one of a first parent IAB node or a second parent IAB node, with the IAB node having dual connectivity with the first parent IAB node and the second parent IAB node; receive information about first resource scheduling from the first parent IAB; receive information about second resource scheduling from the second parent IAB node; and at least one of transmit or receive data based on the received resource allocation information, the information about the first resource scheduling, the information about the second resource scheduling, and a link over the first resource scheduling and the second resource scheduling.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
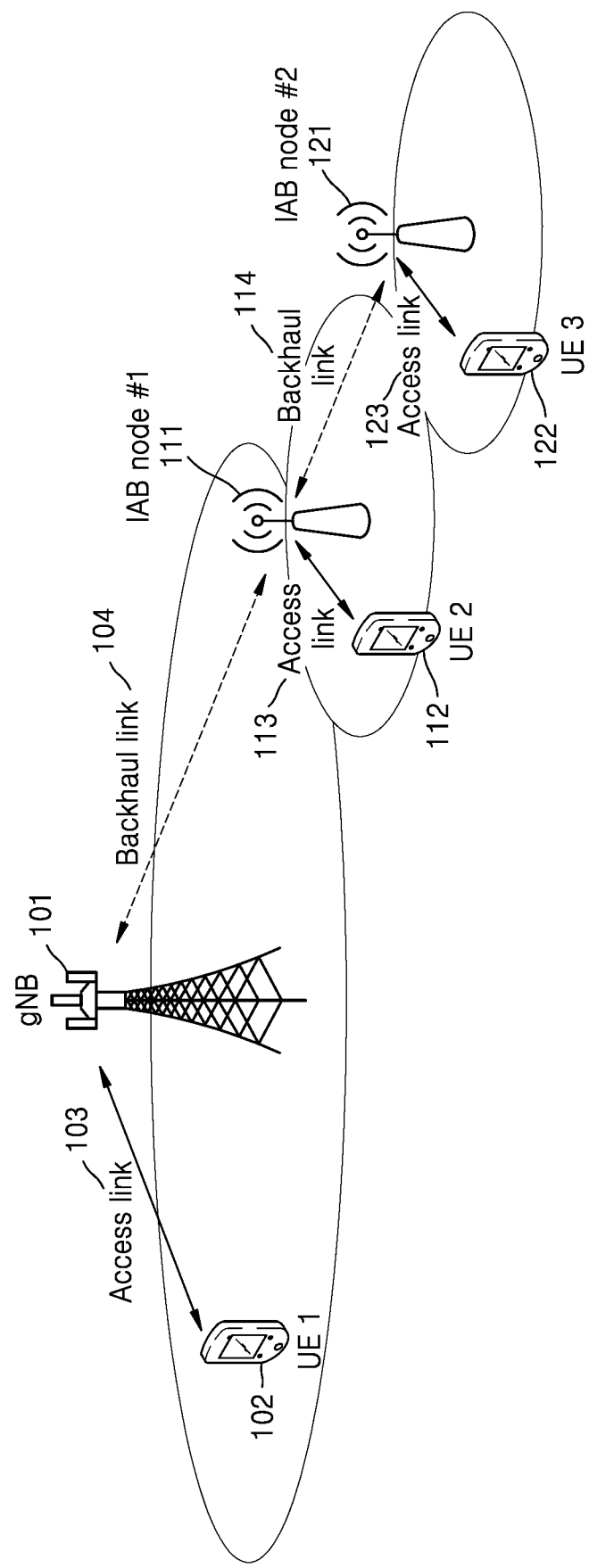
FIG. 1 illustrates a communication system where an IAB node is operated, according to an embodiment.

Embodiments will now be described with reference to accompanying drawings. It is noted that in the drawings, like elements are denoted by like reference numerals. Detailed descriptions of functions and features known to one of skill in the art are omitted to avoid obscuring the gist of the disclosure.

For the same reason, some parts in the accompanying drawings are exaggerated, omitted or schematically illustrated. The size of the respective elements may not fully reflect their actual size. Like numbers refer to like elements throughout the drawings.

Advantages and features of the embodiments, and methods for attaining them will be understood more clearly with reference to the following embodiments, which will be described in detail later along with the accompanying drawings. The embodiments may, however, be presented in many different forms and should not be construed as limited to the embodiments set forth herein; rather, these embodiments are provided so that this disclosure will be thorough and complete, and will fully convey the scope of the embodiments to those of ordinary skill in the art.

Throughout the disclosure, the expression "at least one of a, b or c" indicates only a, only b, only c, both a and b, both a and c, both b and c, all of a, b, and c, or variations thereof.

As used therein, a layer may also be referred to as an entity.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Each block may represent a part of a module, segment, or code including one or more executable instructions to perform particular logic function(s). It is noted that the functions described in the blocks may occur out of order in some alternative embodiments. For example, two blocks shown in succession may in fact be executed substantially concurrently or the blocks may sometimes be executed in the reverse order, depending upon the functionality involved.

The term unit or module as herein used refers to a software or hardware component, such as field programmable gate array (FPGA) or application specific integrated circuit (ASIC) which plays some role. However, the module is not limited to software or hardware. The module may be configured to be stored in an addressable storage medium or to execute one or more processors. For example, the modules may include components, such as software components, object-oriented software components, class components and task components, processes, functions, attributes, procedures, subroutines, segments of program codes, drivers, firmware, micro-codes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card.

To meet ever-increasing demand with respect to wireless data traffic after commercialization of the fourth generation (4G) communication system, there have been efforts to develop an advanced fifth generation (5G) system or pre-5G communication system. For this reason, the 5G or pre-5G communication system is also called a beyond 4G network communication system or post long term evolution (LTE) system.

Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation, and the like are also being developed in the 5G communication system.

In addition, in the 5G system, an advanced coding modulation (ACM), e.g., hybrid frequency shift keying (FSK) and frequency and quadrature amplitude modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of everything (IoE) technologies in which a big data processing technology through connection with a cloud server are combined with an IoT technology, have also emerged. To implement IoT, various technologies, such as a sensing technology, a wired/wireless communication and network infrastructure, a service interfacing technology, and a security technology are required. Even technologies for sensor networks, machine to machine (M2M) communication, machine type communication (MTC) for connection between things are being studied. In the IoT environment, intelligent Internet technology services that create new values for human life by collecting and analyzing data generated from connected things may be provided. IoT may be applied to a variety of areas, such as smart homes, smart buildings, smart cities, smart cars, connected cars, smart grids, health care, smart home appliances and advanced medical services through convergence and combination between existing information technologies and various industrial applications.

Various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud RAN as the aforementioned big data processing technology may be an example of convergence of 5G and IoT technologies.

Various studies to utilize recent IAB technologies are being conducted, and accordingly, improvements in communication services in a dual connectivity environment of an IAB node are also required.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the following description, a BS is an entity for performing resource allocation for a terminal, and may be at least one of a gNB, an eNB, a Node B, a radio access unit, a BS controller, or a network node. The terminal may include a UE, a mobile station (MS), a cellular phone, a smart phone, a computer, or a multimedia system capable of performing a communication function. The terms terminal or UE may refer not only to a cell phone, a narrowband Internet of Things (NB-IoT) device, and a sensor but also to other wireless communication devices. The base station and the terminal are, of course, not limited thereto.

For convenience of explanation, the use of the terms herein is provided in accordance with the definitions in the third generation partnership project (3GPP) LTE and/or new radio (NR) standards. The disclosure is not, however, limited to the terms and definitions, and may equally apply to any systems that conform to other standards.

Wireless communication systems are evolving from early systems that provide voice-oriented services to broadband wireless communication systems that provide high data rate and high quality packet data services such as 3GPP high speed packet access (HSPA), LTE or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts orthogonal frequency division multiplexing (OFDM) for downlink (DL) and single carrier frequency division multiple access (SC-FDMA) for uplink (UL). UL refers to a radio link for a terminal, UE or MS to transmit data or a control signal to a BS or eNode B. DL refers to a radio link for a BS to transmit data or a control signal to a terminal. Such a multiple access scheme allocates and operates time-frequency resources carrying data or control information for each user not to overlap, i.e., to maintain orthogonality, thereby differentiating each user's data or control information.

As a future communication system after the LTE, the 5G (or NR) communication system needs to freely reflect various demands from users and service providers and thus support services that simultaneously meet the various demands. The services considered for the 5G communication system may include enhanced mobile broadband (eMBB), massive machine type communication (mMTC), ultra-reliability low latency communication (URLLC), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Further, the 5G communication system needs to provide increasing user perceived data rate while providing the peak data rate. To satisfy these requirements, various technologies for transmission or reception including MIMO transmission technologies are required to be more enhanced. While the present LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an IoT application service. In order for the mMTC to provide the IoT efficiently, support for access from a massive number of terminals in a cell, enhanced coverage of the terminal, extended battery time, reduction in terminal price, etc., are required. Because the IoT is equipped in various sensors and devices to provide communication functions, the IoT may be supposed to support a large number of UEs in a cell (e.g., 1,000,000 terminals/km$^2$). Further, a UE supporting the mMTC is more likely to be located in a shadow area, such as in a cellar of a building, which might not be covered by a cell by the nature of the service, so the mMTC requires even larger coverage than expected for other services provided by the 5G communication system. The UE supporting the mMTC needs to be a low-cost UE, and requires a quite long battery life, such as 10 to 15 years because the battery in the UE is hard to be changed frequently.

URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLLC services need to satisfy sub-millisecond (less than 0.5 millisecond) air interface latency and simultaneously has a requirement for a packet error rate of $10^{-5}$ or less. Hence, for the URLLC services, the 5G system needs to provide a smaller transmit time interval (TTI) than for other services, and simultaneously requires a design that allocates a wide range of resources for a frequency band to secure reliability of the communication link.

Those three services in 5G, i.e., eMBB, URLLC, and mMTC, may be multiplexed in a single system for transmission. In this case, to meet different requirements for the respective services, different transmission or reception schemes and parameters may be used between the services.

The following embodiments focus on an LTE, LTE-A, LTE Pro or 5G (or NR, next generation mobile communication) system, but may be equally applied to other communication systems with similar technical backgrounds or channel types. Further, embodiments will also be applied to different communication systems with some modifications to such an extent that they do not significantly deviate from the scope of the disclosure based on a determination by one of ordinary skill in the art. In 5G, when a BS transmits or receives data to or from a UE in bands above 6 GHz, mmWave bands in particular, coverage may be limited due to propagation path attenuation. The coverage limitation may be eased by deploying a plurality of relays (or relay nodes) densely in a propagation path between the BS and the UE, but in this case, a significant cost for installing optical cables for backhaul connection between the relays may incur. Hence, instead of installing the optical cables between the relays, a wideband radio frequency resource available for mmWave may be used to transmit or receive backhaul data between the relays to solve the cost problems of installing optical cables and more efficiently use the mmWave band.

Use of mmWave to transmit or receive backhaul data from the BS and to transmit or receive access data finally to the UE via the plurality of relays is referred to as IAB, in which case a relay node that transmits or receives data to or from the BS by wireless backhaul is referred to as an IAB node. In this case, the BS includes a central unit (CU) and a DU, and the IAB node includes a DU and an MT. The CU may control DUs of all IAB nodes connected to the BS through multi-hops.

The IAB node may use different frequency bands or the same frequency band to receive backhaul data from the BS and transmit access data to the UE and to receive access data from the UE and transmit backhaul data to the BS. When using the same frequency band, the IAB node has a half-duplex constraint in an instant. Accordingly, as a method of reducing transmission or reception latency due to the half-duplex constraint of the IAB node, the IAB node, on reception, may subject backhaul data (DL data from a DU of a parent IAB node to the MT of the IAB node and uplink (UL) data from an MT of a child IAB node to the DU of the IAB node) and access data from the UE (UL data from the UE to the IAB node) to frequency division multiplexing (FDM) and/or space division multiplexing (SDM).

Also for transmission, the IAB node may subject backhaul data (UL data from the MT of the IAB node to the DU of a parent IAB node and DL data from the DU of the IAB node to the MT of a child IAB node) and access data to the UE (DL data from the IAB node to the UE) to FDM and/or SDM. In this case, when the IAB node is set up for dual connectivity to a plurality of parent IAB nodes on a higher level of the IAB node, data transmission or reception between DUs of the parent IAB nodes and the MT of the IAB node and data transmission or reception between the DU of the IAB node and the MT of the child IAB on a lower level of the IAB node or the access UE are mixed, in which case it may be difficult to satisfy the haft-duplex constraint at an instance. The disclosure may provide a method by which the IAB node is able to operate to conform to the half-duplex constraint in a data transmission or reception mixed environment.

FIG. 1 illustrates a communication system where an IAB node is operated, according to an embodiment.

In FIG. 1, a gNB 101 is a common BS (e.g., eNB or gNB), which is referred to as a gNB, eNB, BS, donor BS, or donor IAB. IAB node #1 111 and IAB node #2 121 are IAB nodes for performing backhaul link transmission or reception in the mmWave band. UE 1 102 transmits or receives access data with the gNB 101 via an access link 103. The IAB node

1 111 transmits or receives backhaul data with the gNB 101 via a backhaul link 104. UE 2 112 transmits or receives access data with the IAB node #1 111 via an access link 113. The IAB node #2 121 transmits or receives backhaul data with the IAB node #1 111 via a backhaul link 114. Hence, the IAB node #1 111 is a higher IAB node of the IAB node #2 121 and referred to as a parent IAB node, and the IAB node #2 121 is a lower IAB node of the IAB node #1 111, which is referred to as a child IAB node. UE 3 122 transmits or receives access data with the IAB node #2 121 via an access link 123.

Measurement of an IAB node or a donor gNB performed by the UE will now be described.

Coordination between the donor gNB and the IAB nodes may be required for the UE 2 112 or the UE 3 122 to perform measurement on the donor gNB or an IAB node in a neighborhood, which is not a serving IAB node. The donor gNB may match measurement resources for IAB nodes having even hop order or match measurement resources for IAB nodes having odd hop order, thereby minimizing waste of resources in which the UE performs measurement on the neighboring IAB node or IAB BS, The UE may receive a configuration to measure a synchronization signal block (SSB)/physical broadcast channel (PBCH) or a channel state information reference signal (CSI-RS) for measurement of the neighboring IAB node from the serving IAB node or the BS in a higher layer signal. When the UE is configured in the SSB/PBCH to perform measurement on a neighboring BS, the UE may be configured with at least two SSB/PBCH measurement timing configurations (SMTCs) for each frequency for measurement resources for IAB nodes having an even hop order or measurement resources for IAB nodes having an odd hop order. Upon receiving the configuration, the UE may perform measurement on the IAB node having an even hop order in one SMTC and perform measurement on the IAB node having an odd hop order in the other SMTC.

Measurement of an IAB node performed by another IAB node or the donor gNB will now be described.

Coordination between the donor gNB and the IAB nodes may be required for an IAB node to perform measurement on a donor gNB or an IAB node in another neighborhood. The donor gNB may match measurement resources for IAB nodes having an even hop order or match measurement resources for IAB nodes having an odd hop order, thereby minimizing waste of resources in which one IAB node performs measurement on a neighboring IAB node or IAB BS. One IAB node may receive a configuration to measure an SSB/PBCH or a CSI-RS for measurement of a neighboring IAB node in a higher layer signal from a serving IAB node or BS. When an IAB node is configured in the SSB/PBCH to perform measurement on a neighboring BS, the IAB node may be configured with at least two SMTCs for each frequency for measurement resources for IAB nodes having even hop order or measurement resources for IAB nodes having odd hop order. Upon receiving the configuration, the IAB node may perform measurement on the IAB node having even hop order in one SMTC and perform measurement on the IAB node having odd hop order in another SMTC.

In the IAB technology disclosed herein, multiplexing of a backhaul link between the BS and the IAB node or between IAB nodes and an access link between the BS and the UE or between the IAB node and the UE in radio are described in more detail with reference to FIGS. 2, 3 and 4.

Figure 2:
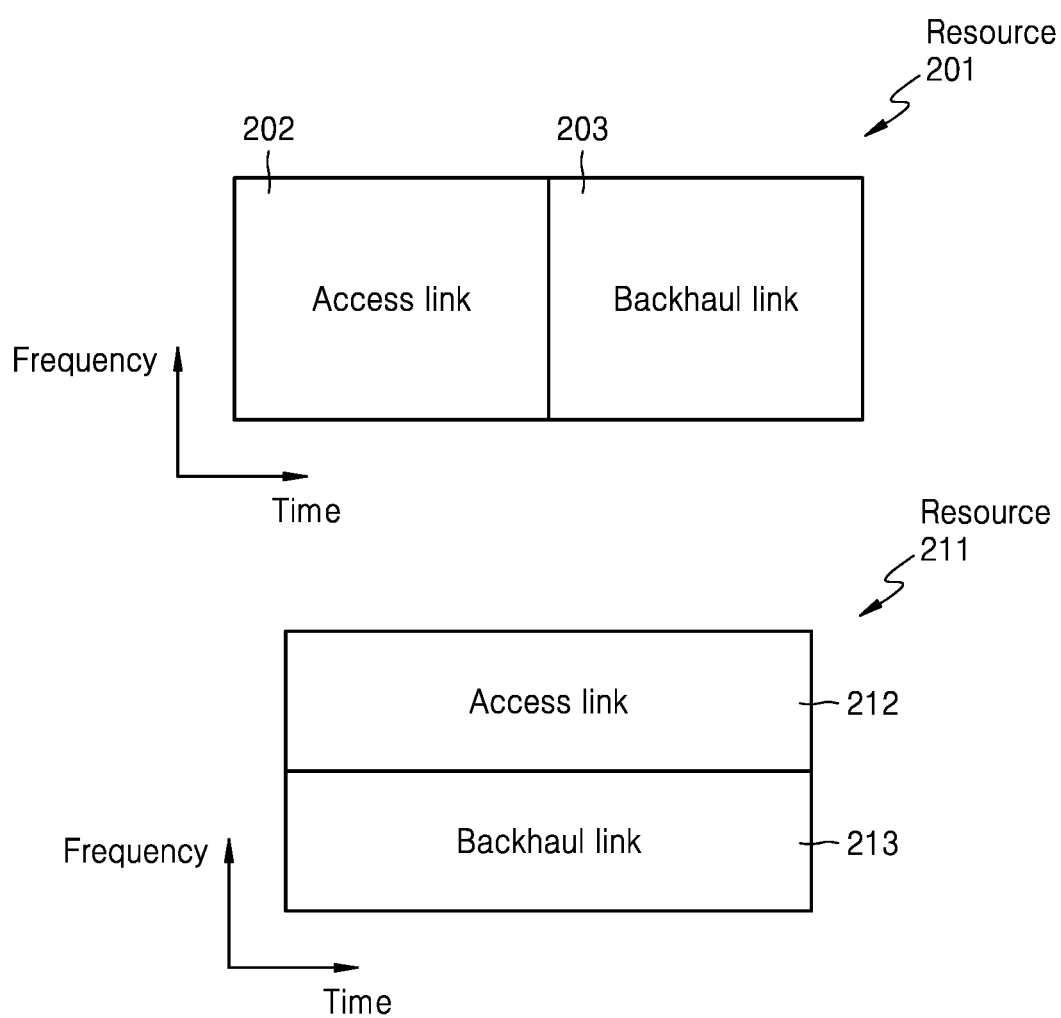
FIG. 2 illustrates multiplexing of an access link and a backhaul link at an IAB node in a time domain or frequency domain, according to an embodiment.

FIG. 2 illustrates multiplexing of an access link and a backhaul link at an IAB node, according to an embodiment.

Time domain multiplexing of access link and backhaul link at an IAB node is shown in an upper portion of FIG. 2. Frequency domain multiplexing of access link and backhaul link at an IAB node is shown in a lower portion of FIG. 2.

In a radio resource 201 shown in the upper portion of FIG. 2, a backhaul link 203 between the gNB and the IAB node or between IAB nodes and an access link 202 between the IAB node and the UE are time domain multiplexed (TDMed). Accordingly, in a time domain in which the gNB or the IAB node transmits or receives data, data transmission or reception between the gNB and IAB nodes is not performed. In a time domain in which data transmission or reception is performed between the gNB and IAB nodes, the gNB or the IAB node does not transmit or receive data with the UE.

In a radio resource 211 shown in the lower portion of FIG. 2, a backhaul link 213 between the gNB and the IAB node or between IAB nodes and an access link 212 between the gNB and the UE or between the IAB node and the UE are frequency domain multiplexed (FDMed). Accordingly, in a time domain where the gNB or the IAB node transmits or receives data with the UE, it is possible to transmit or receive data between the gNB and IAB nodes, but only unidirectional data transmission is possible due to the half-duplex constraint of the IAB nodes. In other words, in a time domain where an IAB node receives data from the UE, the IAB node may only receive backhaul data from another IAB node or a gNB. Similarly, in a time domain where an IAB node transmits data to the UE, the IAB node may only transmit backhaul data to another IAB node or a gNB.

Although only TDM and FDM have been described in connection with FIG. 2, spatial domain multiplexing (SMD) of the access link and the backhaul link in a spatial domain is also possible. Accordingly, the access link and the backhaul link may be transmitted or received at the same time through SDM, but even with the SDM, data transmission in the same direction is only possible under the half-duplex constraints of IAB nodes as with the FDM in the lower portion of FIG. 2. In other words, in a time domain where an IAB node receives data from the UE, the IAB node may only receive backhaul data from another IAB node or a gNB. Similarly, in a time domain where an IAB node transmits data to the UE, the IAB node may only transmit backhaul data to another IAB node or a gNB.

Which multiplexing scheme of TDM, FDM and SDM is to be used may be set by the IAB node transmitting a capability for the multiplexing scheme to the gNB or a higher IAB node when the IAB node makes initial access to the gNB or the higher IAB node and then receiving configuration information from the gNB or higher IAB nodes in system information or a radio resource control (RRC) signal, or receiving configuration information from the gNB or higher IAB nodes through a backhaul link after the initial access.

Figure 3:
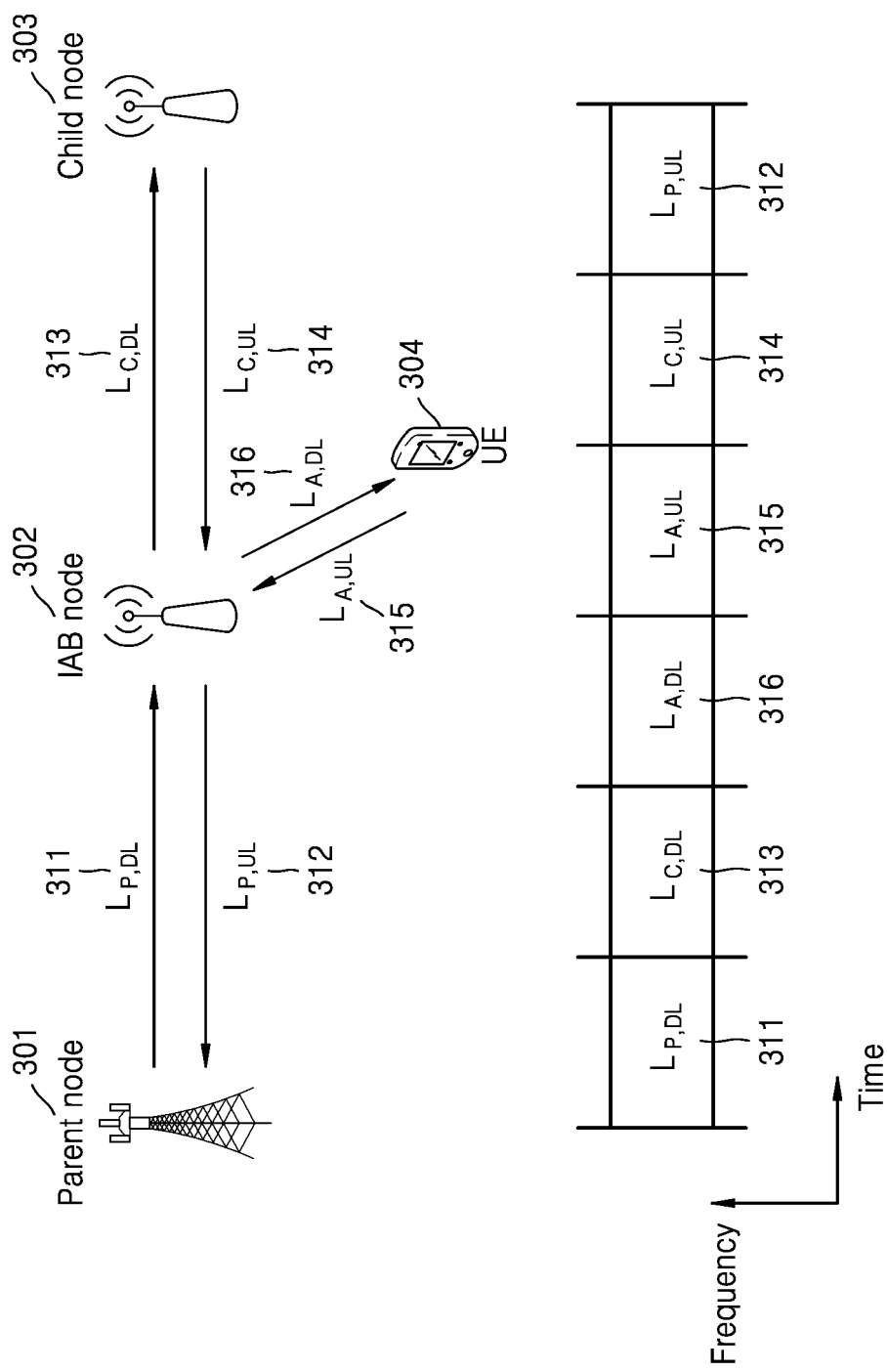
FIG. 3 illustrates multiplexing of an access link and a backhaul link in a time domain in an IAB communication system, according to an embodiment.

FIG. 3 illustrates multiplexing of an access link and a backhaul link in the time domain in an IAB communication system, according to an embodiment.

In the upper portion of FIG. 3, shown is a procedure in which an IAB node 302 communicates with a parent node 301, a child IAB node 303, and a UE 304. Explaining links between the respective nodes in more detail, the parent node 301 transmits a backhaul DL signal to the IAB node 302 in a backhaul DL link $L_{P,DL}$ 311, and the IAB node 302 transmits a backhaul UL signal to the parent node 301 in a backhaul UL link $L_{P,UL}$ 312. The IAB node 302 transmits an access DL signal to the UE 304 in an access DL link $L_{A,DL}$ 316, and the UE 304 transmits an access UL signal to the IAB node 302 in an access UL link $L_{A,UL}$ 315. The IAB node 302 transmits a backhaul DL signal to the child IAB node 303 in a backhaul DL link $L_{C,DL}$ 313, and the child IAB node 303 transmits a backhaul UL signal to the IAB node 302 in a backhaul UL link $L_{C,UL}$ 314. In the above notation, P refers to a backhaul link to a parent, A refers to an access link to the UE, and C refers to a backhaul link to a child.

These link relations are described with respect to the IAB node 302, and from the perspective of the child IAB node 303, the parent node is the IAB node 302 and the child node IAB 303 may have another IAB child node on its lower level. From the perspective of the parent node 301, the child node is the IAB node 302, and the parent node 301 may have another IAB parent node on its higher level.

The aforementioned signal includes data and control information, a channel for transmitting the data and control information, a reference signal required to decode the data and the control information, or reference signals to figure out channel information.

The lower portion of FIG. 3 shows a procedure for multiplexing the links all in the time domain. In FIG. 3, the backhaul DL link $L_{P,DL}$ 311, the backhaul DL link $L_{C,DL}$ 313, the access DL link $L_{A,DL}$ 316, the access UL link $L_{A,UL}$ 315, the backhaul UL link $L_{C,UL}$ 314, and the backhaul UL link $L_{P,UL}$ 312 are multiplexed in time order. The order of the links illustrated in FIG. 3 is provided as an example, but any order may be equally applied.

The links are multiplexed in time order in the time domain, which may show that the multiplexing scheme requires the longest time to transmit a signal from the parent node 301 to the child IAB node through the IAB node 302 and also even to the UE. Hence, to reduce time latency in transmitting a signal from the parent node 301 to the UE finally, a method of multiplexing backhaul links or the backhaul link and the access link in the frequency domain or in the spatial domain at the same time and transmitting the result at the same time may be considered.

Figure 4:
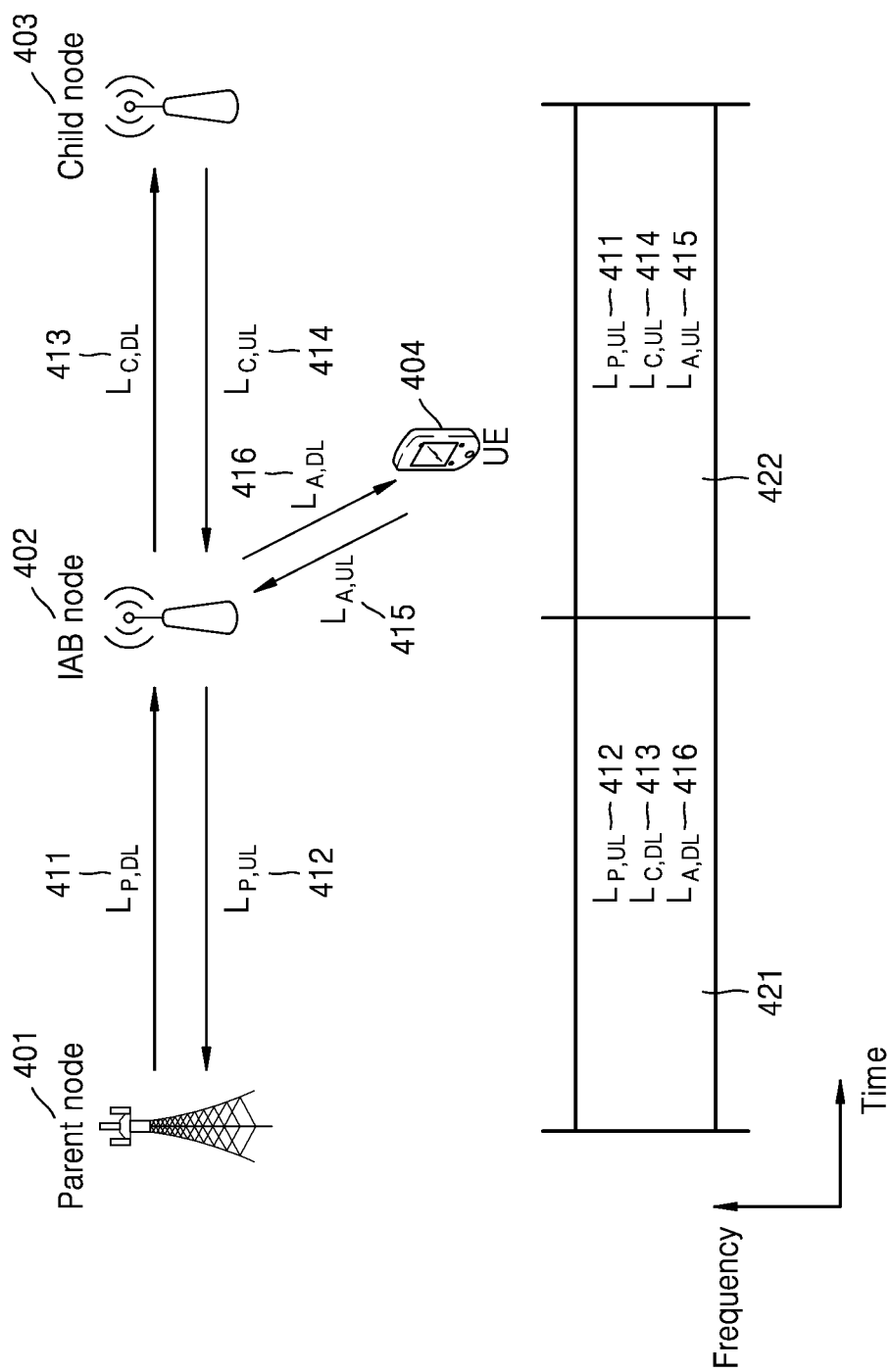
FIG. 4 illustrates multiplexing of an access link and a backhaul link in a frequency and spatial domain in an IAB communication system, according to an embodiment.

FIG. 4 illustrates multiplexing of an access link and a backhaul link in frequency and spatial domains in an IAB communication system, according to an embodiment.

A method of reducing time latency by multiplexing backhaul links or backhaul and access links in the frequency domain or in the spatial domain will be described in connection with FIG. 4.

Similar to FIG. 3, the upper portion of FIG. 4 shows a procedure in which an IAB node 402 communicates with a parent node 401, a child IAB node 403, and a UE 404. In more detail, the parent node 401 transmits a backhaul DL signal to the IAB node 402 in a backhaul DL link $L_{P,DL}$ 411, and the IAB node 402 transmits a backhaul UL signal to the parent node 401 in a backhaul UL link $L_{P,UL}$ 412. The IAB node 402 transmits an access DL signal to the UE 404 in an access DL link $L_{A,DL}$ 416, and the UE 404 transmits an access UL signal to the IAB node 402 in an access UL link $L_{A,UL}$ 415. The IAB node 402 transmits a backhaul DL signal to the child IAB node 403 in a backhaul DL link $L_{C,DL}$ 413, and the child IAB node 403 transmits a backhaul UL signal to the IAB node 402 in a backhaul UL link $L_{C,UL}$ 414. In the above notation, P refers to a backhaul link to a parent, A refers to an access link to a UE, and C refers to a backhaul link to a child.

These link relations are described with respect to the IAB node 402. From the perspective of the child IAB node 403, the parent node is the IAB node 402 and the child IAB node 403 may have another IAB child node on its lower level From the perspective of the parent node 401, the child node is the IAB node 402, and the parent node 401 may have another IAB parent node on its higher level.

The aforementioned signal includes data and control information, a channel for transmitting the data and control information, a reference signal required to decode the data and the control information, or reference signals to figure out channel information.

The lower portion of FIG. 4 shows a scheme for multiplexing the aforementioned links in the frequency domain or the spatial domain.

As described earlier, the IAB node has a half-duplex constraint in an instant, and limitations therefore exist on the signals that may be multiplexed in the frequency domain or the spatial domain. For example, when the haft-duplex constraint of the IAB node 402 is taken into account, links available to be multiplexed in the time domain in which the IAB node may perform transmission are a backhaul UL link $L_{P,UL}$ 412, a backhaul DL link $L_{C,DL}$ 413, an access DL link $L_{A,DL}$ 416, etc. Accordingly, when the links are multiplexed in the frequency domain or the spatial domain, the IAB node 402 may transmit all the links in the same time domain 421. Further, links available to be multiplexed in the time domain in which the IAB node may perform reception are a backhaul DL link $L_{P,DL}$ 411, a backhaul UL link $L_{C,DL}$ 414, an access UL link $L_{A,UL}$ 415, etc. Accordingly, when the links are multiplexed in the frequency domain or the spatial domain, the IAB node 402 may receive all the links in the same time domain 422.

The multiplexing of the links provided in the drawing is one example, and two of the three links multiplexed in the frequency or spatial domain may be multiplexed.

A structure of the IAB node will now be described.

For 5G, various forms of BS structure, which are optimal to service requirements, have been studied to support various services such as bulk transmission, low-latency and high-reliable or many machine-to-machine communication devices to save capital expenditures (CAPEX) for installing a communication network. In 4G LTE, to reduce CAPEX and effectively handle interference control, a cloud radio access network (C-RAN) structure, in which a data processor and a wireless transceiver (or remote radio head (RRH)) in a BS are separated and the data processor is arranged in the center for processing and the wireless transceiver is arranged at a cell cite, has been commercialized. In the C-RAN structure, when the BS data processor transmits baseband digital IQ data to the wireless transceiver, an optical link of a common public radio interface (CPRI) standard is commonly used. When sending data to the wireless transceiver, large data volume is required. For example, a transmission rate of 614.4 Mbps is required to send 10 MHz of Internet protocol (IP) data, and a transmission rate of 1.2 Gbps is required to send 20 MHz of IP data. Accordingly, the 5G RAN structure is designed to have various structures by dividing a BS (gNB) into a CU and a DU to reduce huge loads of optical links and applying functional split to the CU and DU. The 3GPP is working on standardization of many different functional split options for CU and DU. The functional split options are to split an inter-protocol layer or an intra-protocol layer into functions, and there may be a total of 8 options from option 1 to option 8, among which option 2 and option 7 are first taken into consideration in the current 5G BS structure. Option 2 has RRC and packet data convergence protocol (PDCP) layers located in the CU and radio link control (RLC), medium access control (MAC), physical (PHY) and radio frequency (RF) layers located in the DU. Option 7 has RRC, PDCP, RLC, MAC, and upper PHY layers located in the CU and a lower PHY layer located in the DU. This functional split allows a presence of a structure having deployment flexibility to separate and migrate NR network protocols between the CU and the DU. This structure leads to flexible hardware implementation, providing a cost-effective solution, and the separation structure between the CU and the DU allows for adjustment of load management and real-time performance optimization, enables network functions virtualization (NFV)/software defined network (SDN), and the configurable functional split is applicable to various applications, e.g., variable latency in transmission.

An architecture of an IAB node that takes into account the function split will is described in connection with FIG. 5.

Figure 5:
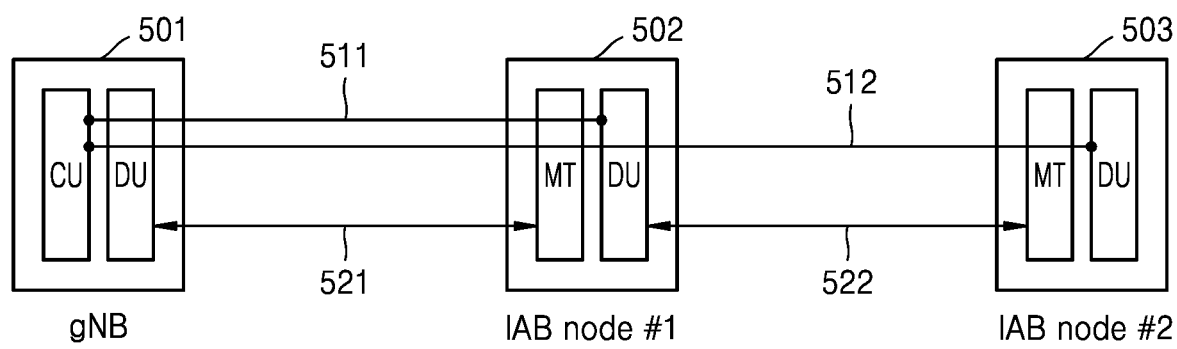
FIG. 5 illustrates a structure of an IAB node, according to an embodiment.

FIG. 5 illustrates an architecture of an IAB node, according to an embodiment.

In FIG. 5, a gNB 501 is comprised of a CU and a DU, and IAB nodes are each comprised of an MT for transmitting or receiving data to or from a parent node in a backhaul link, and a DU for transmitting or receiving data to a child node in a backhaul link. In FIG. 5, an IAB node #1 502 is wirelessly connected to the gNB 501 with one hop, and an IAB node #2 503 is wirelessly connected to the gNB 501 via the IAB node # 502 with two hops.

As shown in FIG. 5, the CU of the gNB 501 controls not only the DU of the gNB 501 but also the DUs of all of the IAB nodes that are wirelessly connected to the gNB 501, i.e., the IAB node #1 502 and the IAB node #2 503 (511 and 512). The CU may allocate a radio resource for the DU so that the DU is able to transmit or receive data to or from an MT of an IAB node on a lower level of the DU. Allocation of the radio resource may be performed by using an F1 application protocol (PAP) interface and transmitting system information, a higher layer signal, or a physical signal to the DU. The radio resource may be comprised of a DL time resource, a UL time resource, a flexible time resource, etc.

Configuration of the radio resource is described based on the IAB node #2 503. The DL time resource is a resource for the DU of the IAB node #2 503 to transmit DL control/data and signals to the MT of an IAB node on the lower level. The UL time resource is a resource for the DU of the IAB node #2 503 to receive UL control/data and the UL time resource signals from the MT of the IAB node on the lower level. The flexible time resource is a resource that may be used by the DU of the IAB node #2 503 as the DL time resource or the UL time resource, and indicates to the MT of the lower IAB node how to use the flexible time resource in a DL control signal of the DU of the IAB node #2 503. On receiving the DL control signal, the MT determines whether the flexible time resource is to be used for the DL time resource or the UL time resource. When failing to receive the DL control signal, the MT does not perform transmission or reception operation. In other words, the MT does not monitor or decode the DL control channel in the resource, and does not measure a signal in the resource. The MT does not perform transmission or reception operation in the resource. In other words, the MT does not monitor or decode the DL control channel in the resource and does not measure a signal in the resource. Two different types (or three different types including the time resource that is always unavailable) for the DL time resource, the UL time resource, and the flexible time resource may be indicated from the CU to the DU.

The first type for the DL time resource is a soft type in which the CU may use the F1AP (an interface between the CU and DU) to configure the DU of the IAB node #2 503 with a DL time resource, a UL time resource or a flexible time resource of the soft type. In this case, for the configured soft type resources, the IAB node #1 502, a parent IAB node (or the DU of the parent IAB node) of the IAB node #2 503, may explicitly (e.g., using a DCI format) or implicitly indicate to the IAB node #2 503, the child IAB node (or the DU of the child IAB node), whether the resource is available or not available. Upon indication that a particular resource is available, the DU of the IAB node #2 503 may use the resource for data transmission or reception with the MT of a lower IAB node. The DU of the IAB node #2 503 may use the resource to perform transmission when the resource is the DL resource or reception when the resource is the UL resource. Upon indication that the particular resource is not available, the IAB node #2 503 may not use the resource for data transmission or reception with the MT of the lower IAB node. In other words, the DU of the IA node #2 503 is unable to use the resource for transmission or reception.

A method of indicating the availability of the soft type resource in a DCI format is described in more detail in the following embodiments, in which the DCI format may include an availability indicator to indicate availability of one or more successive UL, DL or flexible symbols.

The IAB node #2 503 may receive information about at least one of a location of the availability indicator indicating availability of the IAB node #2 in the DCI format, a table indicating availability of time resources corresponding to multiple slots, or a mapping relation of the availability indicator along with a cell ID of the DU of the IAB node #2 503 from the CU or the parent IAB node (e.g., the IAB node #1 502) in higher layer signals in advance to receive the DCI format. Values (or indicators) indicating availability of successive UL symbols, DL symbols, or flexible symbols in one slot and meanings of the values (or indicators) may be represented as in Table 1 below:

TABLE 1

| Value | indication |
| --- | --- |
| 0 | No availability indicator for soft symbols |
| 1 | DL soft symbols are indicated as available |
|   | No availability indicator for UL and flexible soft symbols |
| 2 | UL soft symbols are indicated as available |
|   | No availability indicator for DL and flexible soft symbols |
| 3 | UL and DL soft symbols are indicated as available |
|   | No availability indicator for flexible soft symbols |
| 4 | flexible soft symbols are indicated as available |
|   | No availability indicator for DL and UL soft symbols |
| 5 | DL and flexible soft symbols are indicated as available |
|   | No availability indicator for UL soft symbols |
| 6 | UL and flexible soft symbols are indicated as available |
|   | No availability indicator for DL soft symbols |
| 7 | DL, UL and flexible soft symbols are indicated as available |

When the availability indicator is indicated from the parent IAB node to the IAB node #2 503 in the DCI format and the IAB node #2 503 receives the indication, the following methods may be considered as a method by which the DU of the IAB node #2 503 interprets relations between the DL, UL or flexible time resource and the availability configured for the IAB DU by the CU.

As a first method for an IAB DU to expect that the number of values indicating availability included in the availability indicator in the DCI format corresponds to the number of slots including a soft type of successive symbols configured by the CU, the IAB DU may determine that the availability is applied only to the slots including the soft type.

A second method is provided for the IAB DU to expect that the number of values indicating availability included in the availability indicator in the DCI format corresponds to the number of all slots set by the CU, i.e., the number of all slots having hard/soft/NA types. In the meantime, in this embodiment, the IAB DU may determine that the availability is applied to the slot having the soft type and that the availability is not applied to the slot having the hard type or an NA type, without the soft type.

In the first and second methods, the IAB DU may expect that the meaning of a value that indicates the availability corresponds to a DL resource, a UL resource, or a flexible resource. For example, when only a DL soft resource or a DL hard resource is in the slot, the IAB DU may expect that it is also possible that only a value of 1 is indicated in Table 1, above. Accordingly, among the values in Table 1, values including availability of the UL soft resource may not be expected to be indicated.

Alternatively, the IAB DU may determine that it is also possible that, for at least the flexible resource configured by the CU, whether the DL resource or the UL resource is available is indicated in addition to the value indicating that the flexible resource is available. For example, for the flexible soft resource or the flexible hard resource, the DU of the IAB node may expect that it is possible to indicate a value of 1 or 2 instead of a value of 4 in Table 1, above. In this case, the DU of the IAB node #2 may determine that it is possible for the flexible resource to be used as UL or DL according to an indication from the parent IAB instead of a determination by the IAB node #2.

Alternatively, the IAB DU expects that a value of 0 may be indicated in Table 1, even for any hard/soft or non-available (NA) resource configured by the CU. In this case, the IAB DU determines that the hard/soft resource that has been configured by the CU is not available, and the resource is regarded as not being available for the DU of the IAB node #2 for data transmission or reception with the MT of a lower IAB node as in the case of the always-non-available resource type configured by the CU until later indicated in the DCI format as available. When the resource is indicated by the DCI format as again being available, the DU of the IAB node #2 may use the resource as configured by the CU or received in the DCI format.

The second type for the DL time resource is a hard type, in which case resources are always available between the DU and the MT. Specifically, regardless of transmission or reception operation of the MT of the IA node #2 503, the DU of the IAB node #2 503 may perform transmission when the resource is the DL time resource and perform reception when the resource is the UL resource. When the resource is the flexible resource, the IAB DU may determine to perform transmission or reception (to correspond to the DCI format indicating whether the flexible resource is the DL resource or UL resource to the MT of a lower IAB node).

The third type for the DL time resource is an always-not-used or always-non-available type, in which case the resources may not be used by the DU of the IAB node #2 for data transmission or reception with the MT.

The above types are received together when the DL time resource, the UL time resource, the flexible time resource, or a reserved time resource is received by the DU from the CU in a higher layer signal.

The DU of the gNB 501 is a common BS, and the DU controls the MT of the IAB node #1 502 for scheduling of data transmission or reception 521. The DU of IAB #1 502 is a common BS, and the DU controls the MT of the IAB node #2 503 for scheduling of data transmission or reception 522.

The DU may indicate a radio resource for data transmission or reception with the MT of a lower IAB node based on a radio resource allocated from the CU. Configuration of the radio resource may be transmitted to the MT in system information, a higher layer signal, or a physical signal. The radio resource may be comprised of a DL time resource, a UL time resource, a flexible time resource, a reserved time resource, etc. The DL time resource is a resource for the DU to transmit DL control/data and signals to the MT of the lower IAB node. The UL time resource is a resource for the DU to receive UL control/data and signals from the MT of the lower IAB node. The flexible time resource is a resource that may be used by the DU as the DL time resource or the UL time resource, and how to use the flexible time resource may be indicated to the MT of the lower IAB in a DL control signal of the DU. On receiving the DL control signal, the MT determines whether the flexible time resource is used for the DL time resource or the UL time resource. When failing to receive the DL control signal, the MT does not perform transmission or reception operation. In other words, the MT does not monitor or decode the DL control channel in the resource nor measure a signal in the resource.

The DL control signal is a combination of a higher layer signal and a physical signal signaled to the MT, and the MT may receive the signaling and determine a slot format in a particular slot. The slot format is basically formed to start with a DL symbol, have a flexible symbol located in the middle, and end with a UL symbol (i.e., a structure having an order of D-F-U). When the slot format is used, the DU of the IAB node may be able to perform DL transmission at the start of the slot, but the MT of the IAB node configured by the parent IAB in the same slot format (i.e., the D-F-U structure) is unable to perform UL transmission at the same time (corresponding to slot format indexes 0 to 55 in Table 2, below). Accordingly, a slot format formed to start with the UL symbol, having the flexible symbol located in the middle and ending with the DL symbol may be defined as in Table 2, below (corresponding to slot format indexes 56 to 96 in Table 2, below). The slot format defined in Table 2 may be transmitted to the MT by using the DL control signal, and may be configured by the CU for the DU by using FLAP.

TABLE 2

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |

TABLE 2-continued

| Format | \multicolumn{14}{c}{Symbol number in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | U | U | U | D | D | D | D | D | D | D |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | D | D |
| 81 | U | U | U | U | U | U | U | U | U | F | F | F | D | D |
| 82 | U | U | U | U | U | U | U | U | F | F | F | D | D | D |
| 83 | U | U | U | U | U | U | U | F | F | F | F | D | D | D |
| 84 | U | F | D | D | D | D | D | D | D | D | D | D | D | D |
| 85 | U | U | F | D | D | D | D | D | D | D | D | D | D | D |

TABLE 2-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | U | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | U | D | D | D | D | D | D | D |
| 97~254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats Or IAB MT determines the slot format for the slot based on tdd-UL-DL-ConfigurationCommon, or tdd-UL-DL-ConfigurationDedicated-IAB-MT and, if any, on detected DCI formats | | | | | | | | | | | | | |

The reserved time resource is a resource in which the DU is unable to transmit or receive data to or from an MT on a lower level, so the MT does not perform a transmission or reception operation in the resource. In other words, the MT does not monitor or decode the DL control channel in the resource, and the MT does not measure a signal in the resource.

Accordingly, the MT in an IAB node is controlled by a DU in an upper IAB node to receive a schedule for data transmission or reception, and the DU in the same IAB node is controlled by the CU of the gNB 501. In other words, the MT and the DU in one IAB are controlled by different entities, so that it may be difficult for the MT and the DU to be coordinated in real time.

Figure 6:
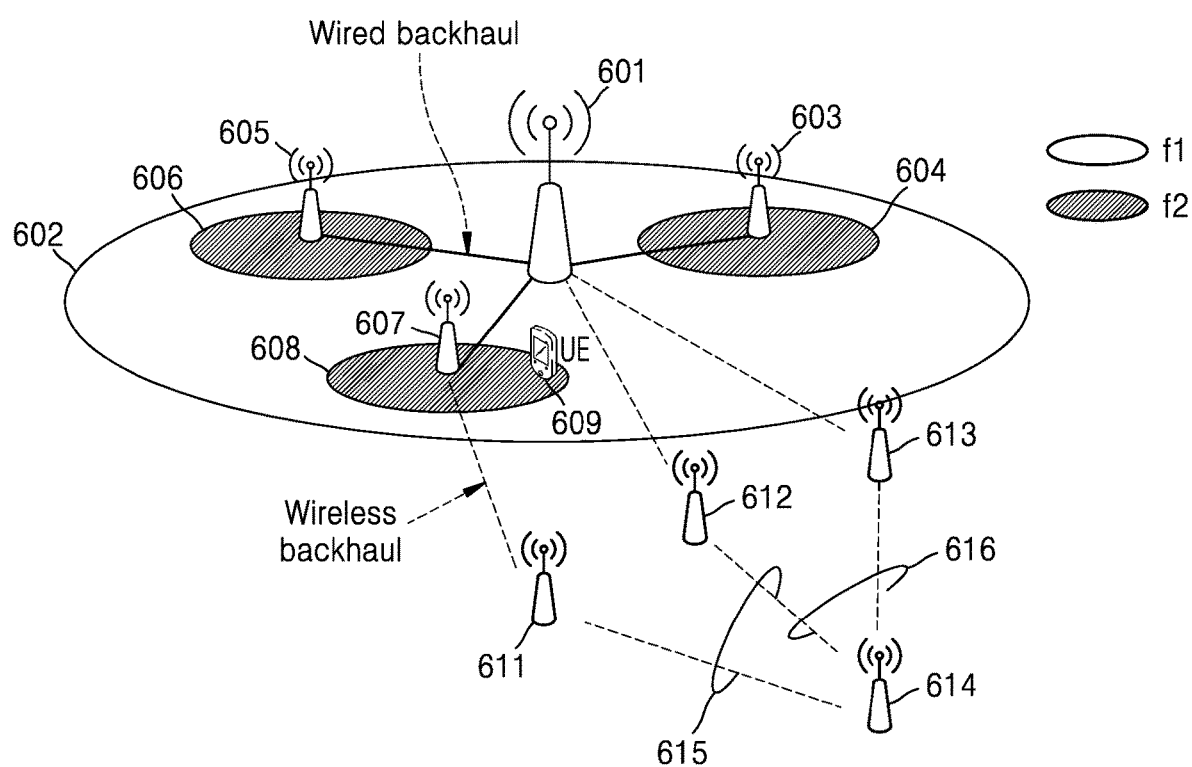
FIG. 6 illustrates a communication system, according to an embodiment.

FIG. 6 illustrates a communication system, according to an embodiment. That is, FIG. 6 provides an example of a system formed by combining a BS that is in charge of a new radio access technology and an LTE/LTE-A BS. However, there may also be a system formed by combining BSs responsible for new radio access technologies.

Referring to FIG. 6, micro BSs 603, 605 and 607 having respectively relatively small coverages 604, 606 and 608 may be deployed within coverage 602 of a macro BS 601. The macro BS 601 is generally allowed to transmit signals with higher transmission power than the micro BS 603, 605 or 607, so the coverage 602 of the macro BS 601 is larger than the respective coverage 604, 606 or 608 of the micro BS 603, 605 or 607. In FIG. 6, the BS refers to an LTE/LTE-A system that operates in a relatively low-frequency band, and the micro BSs 603, 605, or 607 refers to respective systems to which a new radio access technology (NR or 5G) that operates in a relatively high-frequency band is applied.

The macro BS 601 and the micro BSs 603, 605 and 607 are interconnected, and there may be a certain degree of backhaul delay depending on the connection status. Hence, it may not be desirable to exchange information susceptible to the transmission delay between the macro BS 601 and the micro BSs 603, 605 or 607.

Although the example of FIG. 6 illustrates carrier aggregation between the macro BS 601 and the micro BS 603, 605 or 607, the disclosure is not limited thereto and may be equally applied to carrier aggregation between BSs located in different geological places. For example, in some embodiments, it may be equally applied to carrier aggregation between macro BSs located in different places or carrier aggregation between micro BSs located in different places. Further, there are no limitations on the number of carriers. The disclosure may also be applied to carrier aggregation in the macro BS 601 and carrier aggregation in the micro BSs (603, 605 or 607).

Referring to FIG. 6, the macro BS 601 may use frequency f1 for DL signal transmission, and the micro BSs 603, 605 or 607 may use frequency f2 for DL signal transmission. In this case, the macro BS 601 may transmit data or control information to a UE 609 at frequency f1, and the micro BSs 603, 605 or 607 may transmit data or control information to the UE 609 at frequency f2. With the aforementioned carrier aggregation, a BS to which the new radio access technology that supports high-frequency to ultra-high frequency bands is applied may provide an ultrahigh-speed data service and an ultra-low latency service, and along with this, a BS to which the LTE/LTE-A technology is applied in a relatively low-frequency band may support reliable UE mobility.

The configuration illustrated in FIG. 6 may be applied not only to DL carrier aggregation but also to UL carrier aggregation. For example, the UE 609 may transmit data or control information to the macro BS 601 through a frequency f1 for UL signal transmission. The UE 609 may transmit data or control information to the micro BSs 603, 605 or 607 through a frequency f2' for UL signal transmission. The f1 may correspond to the f1, and the f2' may correspond to the f2. UL signal transmission of the UE to the macro BS and the micro BS may be performed at different points in time or at the same time. In either case, due to the physical constraint of a power amplifier in the UE and the propagation constraint on the UE output power, a total of UL transmit power of the UE in an instant needs to be kept within a certain threshold value.

The UE 609 performing communication by accessing the macro BS 601 and the micro BSs 603, 605 or 607 in such an environment as in FIG. 6 is referred to as dual connectivity (DC). When the UE performs dual connectivity, the following three configurations may be provided. According to the first configuration, the UE receives configuration information for data transmission or reception for the macro BS 601 in a higher layer signal (system or RRC signal) after the UE performs initial access to the macro BS 601 that operates as the LTE/LTE-A system. The UE then receives configuration information for data transmission or reception for the micro BS 603, 605 or 607 that operates as an NR system in a higher layer signal (system or RRC signal) of the macro BS 601 and performs random access to the micro BS 603, 605 or 607, and thus enters the dual connectivity state in which the UE is allowed to transmit or receive data to or from the macro BS 601 and the micro BS 603, 605 or 607. In this case, the macro BS 601 operating as the LTE/LTE-A system belongs to a master cell group (MCG) and the micro BS 603, 605 or 607 operating as the NR system belongs to a secondary cell group (SCG). The UE being in the dual connectivity state may be represented as the UE being configured with the MCG using E-UTRA radio access (or LTE/LTE-A) and the SCG using NR radio access. Alternatively, the UE may be represented as being configured with E-UTRA NR dual connectivity (EN-DC).

According to the second configuration, the UE receives configuration information for data transmission or reception for the micro BS 603, 605, or 607 in a higher layer signal (system or RRC signal) after the UE performs initial access to the micro BS 603, 605 or 607 that operates as the NR system. The UE then receives configuration information for data transmission or reception for the macro BS 601 that operates as the LTE/LTE system in a higher layer signal (system or RRC signal) from the micro BS 603, 605 or 607 and performs random access to the macro BS 601, and thus enters the dual connectivity state in which the UE is allowed to transmit or receive data to or from the macro BS 601 and the micro BS 603, 605 or 607. In this case, the micro BS 603, 605 or 607 that operates as the NR system belongs to the MCG, and the macro BS 601 that operates as the LTE system belongs to the SCG. The UE being in the dual connectivity state may be represented as the UE being configured with the MCG using NR radio access and the SCG using E-UTRA radio access (or LTE/LTE-A). Alternatively, the UE may be represented as being configured with NR E-UTRA dual connectivity (NE-DC).

According to the third configuration, after the UE performs initial access to a first BS 601, 603, 605 or 607 that operates as the NR system, the UE receives configuration information for data transmission or reception for the first BS 601, 603, 605 or 607 in a higher layer signal (system or RRC signal). The UE then receives configuration information for data transmission or reception for another second BS 601, 603, 605 or 607 that operates as the NR system in a higher layer signal (system or RRC signal) from the first BS and performs random access to the second BS, and thus enters the dual connectivity state in which the UE is allowed to transmit or receive data to or from the first BS and the second BS. In this case, the first BS that operates as the NR system belongs to the MCG, and the second BS 2 that operates as the NR system belongs to the SCG. The UE being in the dual connectivity state may be represented as the UE being configured with the MCG using NR radio access and the SCG using NR radio access. Alternatively, the UE may be represented as being configured with NR NR dual connectivity (NN-DC).

The dual connectivity configuration, as described above with respect to UE 609 may also be applied to an IAB node 614. The dual connectivity configuration and access procedure of the UE 609 may also be applied to dual connectivity of the IAB node 614. Accordingly, the dual connectivity procedure and method of the UE 609 may be applied so that the IAB node 614 may make dual connectivity to different parent IAB nodes 611 and 612 each connected to a different donor BS 601 or 607 by wireless backhaul 615 or to different parent IAB nodes 612 and 613 both connected to one donor BS 601 by wireless backhaul 616. The dual connectivity structure of an IAB node is in detail in connection with FIGS. 7 and 8.

A structure in which an IAB node makes dual connectivity to different parent IAB nodes connected to one donor BS by wireless backhaul is described with reference to FIG. 7.

Figure 7:
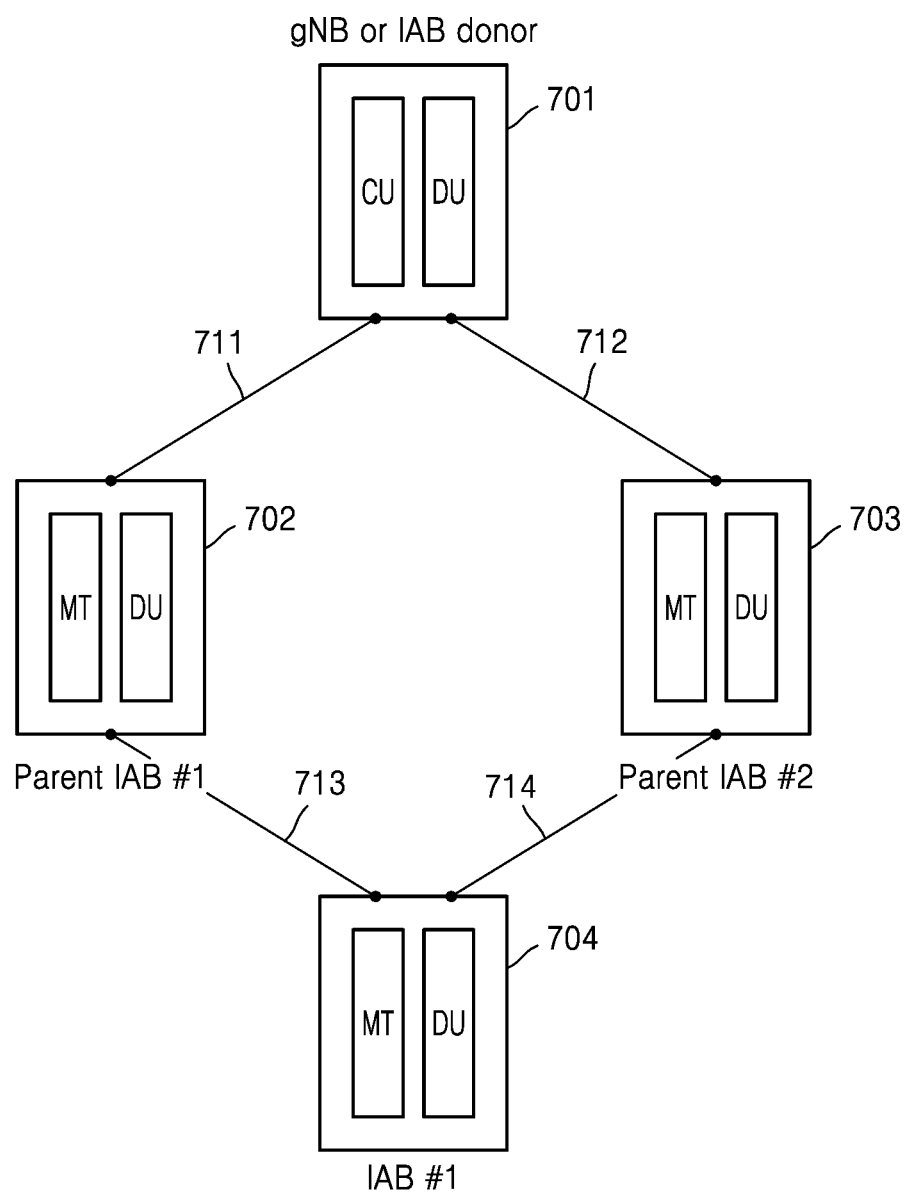
FIG. 7 illustrates a dual connectivity structure of an IAB node, according to an embodiment.

FIG. 7 illustrates a dual connectivity structure of an IAB node, according to an embodiment. The dual connectivity structure of the IAB node in FIG. 7 is a structure that takes into account the function split described above.

In FIG. 7, a gNB 701 is comprised of a CU and a DU, and IAB nodes are each comprised of an MT for transmitting or receiving data to or from a parent node in a backhaul link, and a DU for transmitting or receiving data to a child node in a backhaul link. In FIG. 7, an IAB node #1 702 is wirelessly connected to the gNB 701 with one hop 711, and an IAB node #2 703 is wirelessly connected to the gNB 701 with one hop 712. An IAB node #1 704 makes dual connectivity to the different parent IAB nodes #1 702 and #2 703, and is wirelessly connected to the gNB 701 via the different parent IAB nodes 702 and 703 with two hops, i.e., either 711 and 713, or 712 and 714.

FIG. 7, the CU of the gNB 701 controls not only the DU of the gNB 701 but also DUs of all IAB nodes wirelessly connected to the gNB 701, i.e., the parent IAB node #1 702, the parent IAB node #2 703 and IAB node #1 704. The CU may allocate a radio resource for the DU so that the DU is able to transmit or receive data to or from an MT of an IAB node on a lower level of the DU. Allocation of the radio resource may be performed by using an F1AP interface and transmitting system information, a higher layer signal or a physical signal to the DU. In this case, the IAB node of the DU that has received the radio resource uses the resource to transmit or receive DL control/data and signals or UL control/data and signals to or from the MT of a lower child IAB node according to the resource configuration configured with the DL time resource, the UL time resource, the flexible time resource, a resource type, availability, etc., and indication from the DU of the higher parent IAB node.

In FIG. 7, the IAB node #1 704 is in dual connectivity to the different parent IAB node #1 702 and parent IAB node #2 703, and the parent IAB node #1 702 and the parent IAB node #2 703 are connected to the one donor BS 701 by wireless backhaul. Accordingly, as the MT in the IAB node #1 704 is controlled by each DU in the parent IAB node 702 or 703 on the higher level to receive scheduling for data transmission or reception, and the DU of the IAB node #1 704 needs to serve as a BS for data transmission or reception with the lower IAB node and the UE, so that it may be difficult for the MT and the DU of the IAB node #1 704 to be coordinated with each other in real time.

A structure in which an IAB node makes dual connectivity to different parent IAB nodes connected to different donor BSs, respectively, by wireless backhaul is described with reference to FIG. 8.

Figure 8:
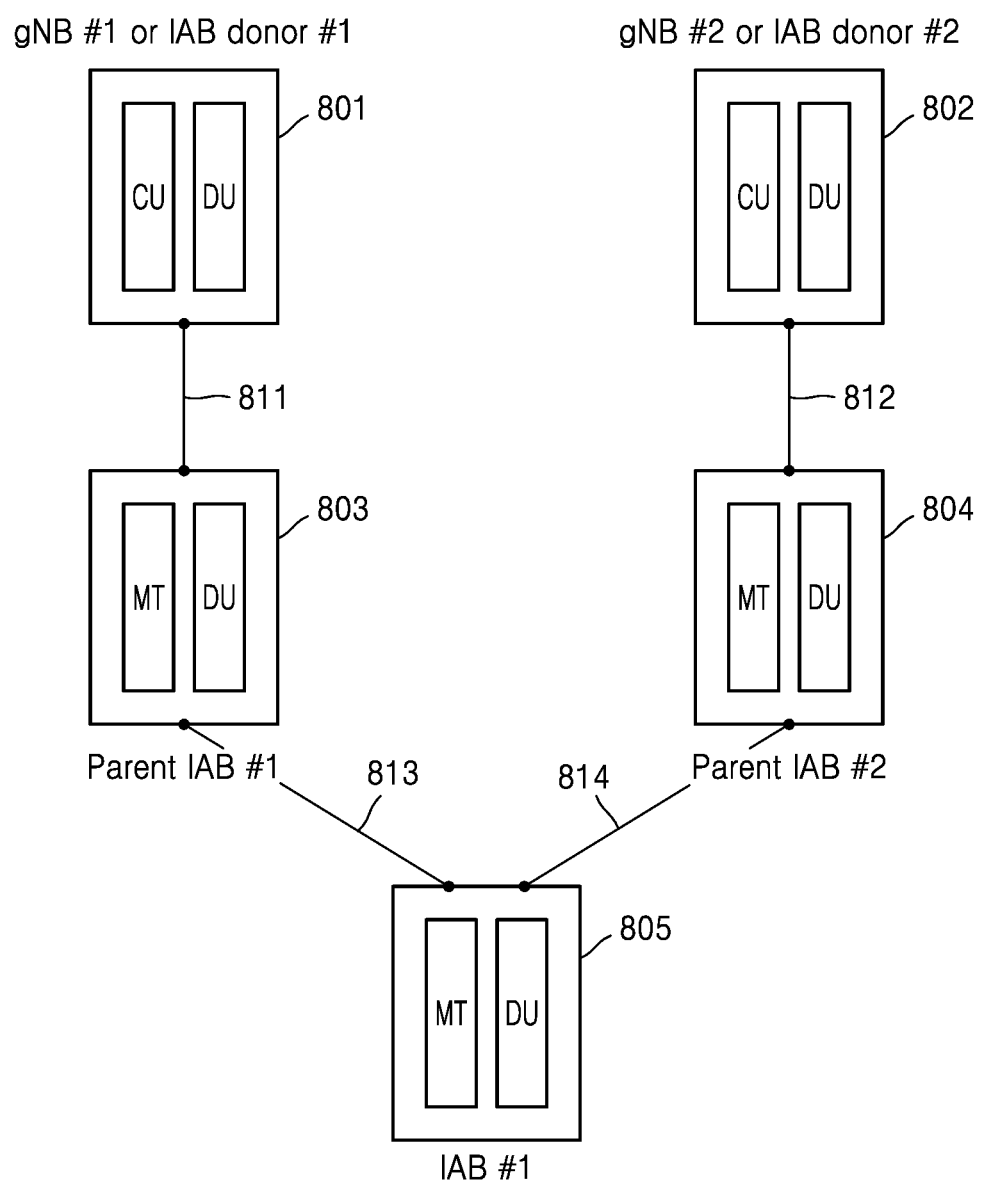
FIG. 8 illustrates a dual connectivity structure of an IAB node, according to an embodiment.

FIG. 8 illustrates a dual connectivity structure of an IAB node, according to an embodiment. The dual connectivity structure of the IAB node in FIG. 8 is a structure that takes into account the function split as described above.

In FIG. 8, a gNB #1 801 is comprised of a CU and a DU, and IAB nodes are each comprised of an MT for transmitting or receiving data to or from a parent node in a backhaul link and a DU for transmitting or receiving data to a child node in a backhaul link. In FIG. 8, a parent IAB node #1 803 is wirelessly connected to the gNB #1 801 with one hop (811), and a parent IAB node #2 804 is wirelessly connected to a gNB #2 802 with one hop (812). An IAB node #1 805 makes dual connectivity to the different parent IAB node #1 803 and parent IAB node #2 804, and is wirelessly connected to the gNB #1 801 and the gNB #2 802 via the different parent IAB nodes with two hops, i.e., either 811 and 813, or 812 and 814.

The CU of the gNB #1 801 may control only the DU of the gNB #1 801 or may also control a DU of any lower IAB node wirelessly connected to the gNB #1 801, i.e., the parent IAB node #1 803. The CU of the gNB #2 802 may control the DU of the gNB #2 804 or may also control a DU of any lower IAB node wirelessly connected to the gNB #2 802, i.e., the parent IAB node #2 804. The DU of the IAB node #1 805 wirelessly connected to both the gNB #1 801 and the gNB #2 802 may be controlled by the CU of the gNB (e.g., the gNB #1).

The CU may allocate a radio resource for the DU so that the DU is able to transmit or receive data to or from an MT of an IAB node on a lower level of the DU. Allocation of the radio resource may be performed by using an F1AP interface and transmitting system information, a higher layer signal or a physical signal to the DU. In this case, the IAB node of the DU that has received the radio resource uses the resource to transmit or receive DL control/data and signals or UL control/data and signals to or from the MT of a lower child IAB node according to the resource configuration configured with the DL time resource, the UL time resource, the flexible time resource, a resource type, availability, etc., and indication from the DU of the higher parent IAB node.

In FIG. 8, the IAB node #1 805 is in dual connectivity to the different parent IAB node #1 803 and parent IAB node #2 804, and the parent IAB node #1 803 and the parent IAB node #2 804 are connected to different donor BSs 801 and 802, respectively, by wireless backhaul. Accordingly, as the MT in the IAB node #1 805 is controlled by each DU in either parent IAB node #1 803 or parent IAB node #2 804 on the higher level to receive scheduling for data transmission or reception, and the DU of the IAB node #1 805 needs to serve as a BS for data transmission or reception with the lower IAB node and the UE, so that it may be difficult for the MT and the DU in the IAB node #1 805 to be coordinated with each other in real time as in the dual connectivity structure of FIG. 7. The details will be described in connection with FIG. 9.

Figure 9:
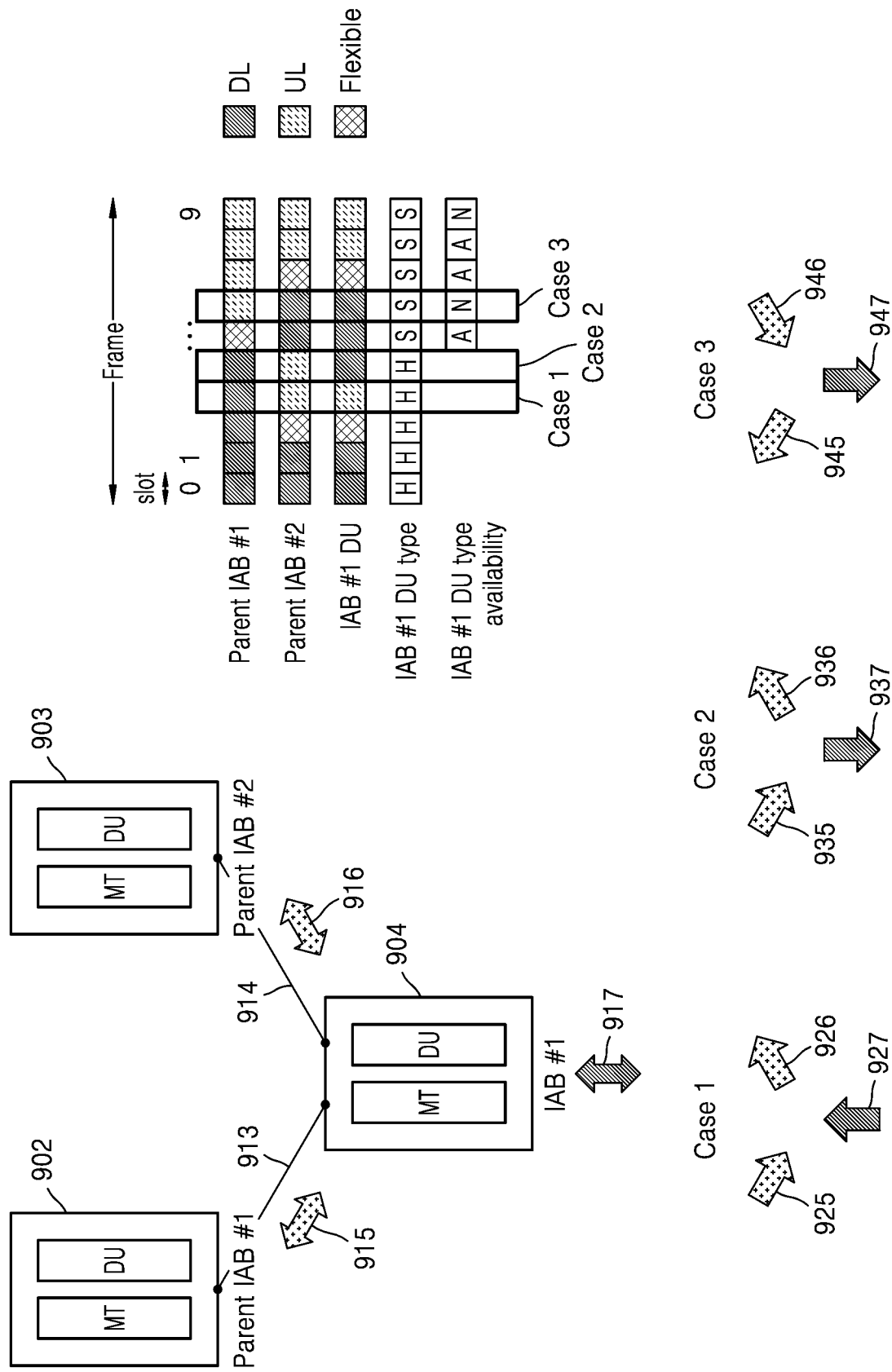
FIG. 9 illustrates an environment that may occur by real-time coordination in a dual connectivity structure of an IAB node, according to an embodiment.

FIG. 9 illustrates an environment that may occur in a dual connectivity structure of an IAB node, according to an embodiment.

FIG. 9 shows a situation where an IAB node #1 904 is wirelessly connected to different parent IAB nodes by dual connectivity as described in connection with FIGS. 7 and 8 (e.g., where the IAB node #1 904 is wirelessly connected 913 to a parent IAB node #1 902 and wirelessly connected 914 to a parent IAB node #2 903), in which case the parent IAB nodes indicate the resources as described in FIGS. 5, 7 and 8 to the MT of the IAB node #1 904 and the CU of the gNB as in FIGS. 7 and 8 indicates resource allocation to the DU of the IAB node #1.

The MT of the IAB node #1 904 may perform DL reception or UL transmission according to configuration and indication from the parent IAB node #1 902 or parent IAB node #2 903, as illustrated in 915 and 916 of FIG. 9. As illustrated in 917 of FIG. 9, the DU of the IAB node #1 904 may perform UL reception or DL transmission according to configuration and indication to the MT of the lower IAB node.

The MT of the IAB node #1 904 determines the time resource as a DL time resource, UL time resource, or flexible time resource based on the configuration and indication from the DU of the parent IAB node #1 902. The MT of the IAB node #1 904 also determines the time resource as a DL time resource, UL time resource, or flexible time resource based on the configuration and indication from the DU of the parent IAB node #2 903. The DU of the IAB node #1 904 determines the time resource as a DL time resource, UL time resource or flexible time resource according to configuration from the CU and determines the resource to be a hard (H) type, a soft (S) type or a not available (NA).

Subsequently, the MT of the IAB node #1 904 may receive DL control/data channel and reference signals when determining the time resource as the DL time resource according to scheduling from the parent IAB node #1 902 or the parent IAB node #2 903, transmit UL control/data channel and reference signals when determining the time resource as the UL time resource, and receive DL control/data channel and reference signals or transmit UL control/data channel and reference signals according to an indication when determining the resource as the flexible time resource. On the other hand, the DU of the IAB node #1 904, may indicate to the MT of a lower IAB node to determine the time resource as the DL time resource, the UL time resource, or the flexible time resource according to the CU and transmit UL control/data channel and reference signals, and thus receive the UL control/data channel and reference signals or transmit DL control/data channel and reference signals. According to the indication and determination of the parent IAB nodes and configuration from the CU, the MT and DU of the IAB node #1 904 each need to determine and perform transmission or reception in the time resource, and in this case, may not satisfy the half-duplex constraint of the IAB node. For example, cases 1, 2 and 3 of FIG. 9 will now be described in detail.

In case 1, the MT of the IAB node #1 904 may determine the time resource as a DL time resource according to the indication from the DU of the parent IAB node #1 902 to receive DL control/data channel and reference signals. At the same time, the MT of the IAB node #1 904 may determine the time resource as a UL time resource according to the indication from the DU of the parent IAB node #2 903 to transmit UL control/data channel and reference signals. Simultaneously, the DU of the IAB node #1 904 may determine the time resource as a UL time resource to receive UL control/data channel and reference signals. Accordingly, when the MT of the IAB node #1 904 needs to perform reception and transmission with the different parent IAB nodes and the DU needs to perform reception, half-duplex constraint may not be satisfied.

In another embodiment, case 1 may include an occasion when the MT of the IAB node #1 904 determines the time resource as the flexible time resource according to an indication from the DU of the parent IAB node #1 902 to receive DL control/data channel and reference signals, and the MT of the IAB node #1 904 determines the time resource as the flexible time resource according to an indication from the DU of the parent IAB node #2 903 to transmit UL control/data channel and reference signals. In other words, case 1 may include an occasion when the time resource is determined as the flexible time resource according to the indication from the DU of the parent IAB node #1 902 and the indication from the DU of the parent IAB node #2 903, and as a result, corresponds to the UL/DL direction of case 1.

In case 2, the MT of the IAB node #1 904 may determine the time resource as a DL time resource according to the indication from the DU of the parent IAB node #1 902 to receive DL control/data channel and reference signals. At the same time, the MT of the IAB node #1 904 may determine the time resource as a UL time resource according to the indication from the DU of the parent IAB node #2 903 to transmit UL control/data channel and reference signals. Simultaneously, the DU of the IAB node #1 904 may determine the time resource as a DL time resource to transmit DL control/data channel and reference signals. Accordingly, when the MT of the IAB node #1 904 needs to perform reception and transmission with the different parent IAB nodes and the DU needs to perform transmission, the half-duplex constraint may not be satisfied. Like the aforementioned case 1, case 2 may include an occasion when the time resource is determined as the flexible time resource according to the indication from the DU of the parent IAB node #1 902 and the indication from the DU of the parent IAB node #2 903, and as a result, corresponds to the UL/DL direction of case 2.

In case 3, the MT of the IAB node #1 904 may determine the time resource as a UL time resource according to the indication from the DU of the parent IAB node #1 902 to transmit UL control/data channel and reference signals. At the same time, the MT of the IAB node #1 904 may determine the time resource as a DL time resource according to the indication from the DU of the parent IAB node #2 903 to receive DL control/data channel and reference signals. Simultaneously, the DU of the IAB node #1 904 may determine the time resource as a DL time resource to transmit DL control/data channel and reference signals. In case 3, the DU of the IAB node #1 904 may also determine the time resource as the UL time resource to receive UL control/data channel and reference signals. Accordingly, when that the MT of the IAB node #1 904 needs to perform transmission and reception with the different parent IAB nodes and the DU needs to perform transmission (or reception), half-duplex constraint may not be satisfied.

In another embodiment, case 3 may also include an occasion when the MT of the IAB node #1 904 determines the time resource as the flexible time resource according to an indication from the DU of the parent IAB node #1 902 to transmit UL control/data channel and reference signals. At the same time, the MT of the IAB node #1 904 determines the time resource as the flexible time resource according to an indication from the DU of the parent IAB node #2 903 to receive DL control/data channel and reference signals. In other words, case 3 may include an occasion when the time resource is determined as the flexible time resource according to the indication from the DU of the parent IAB node #1 902 and the indication from the DU of the parent IAB node #2 903, and as a result, corresponds to the UL/DL direction of case 3.

When reporting half-duplex capability to the IAB donor/parent IAB nodes when transmission or reception of the MT conflicts with transmission or reception of the DU in one IAB node, or when the MT of the IAB node #1 904 connected to the parent IAB node #1 902 and the parent IAB node #2 903 by dual connectivity as shown in FIG. 9 does not support transmission and reception at the same time (i.e., having no simultaneous transmission or reception capability) in different serving cells (or carriers), a method is provided from transmitting or receiving data in the backhaul link while satisfying the half-duplex constraint of the IAB node, in the following embodiments:

Embodiment 1

Embodiment 1 assumes an occasion when transmission and reception of the DU and MT of the IAB node #1 904 may conflict with each other when following the configuration from the CU, or the indication or scheduling from the parent IAB node #1 902 or the parent IAB node #2 903 connected to the IAB node #1 904 by dual connectivity. In Embodiment 1, a procedure for the IAB node #1 904 may be determined according to whether the resource type of the DU of the IAB node #1 904 is hard, soft or non-available.

When the resource type of the DU of the IAB node #1 904 is hard, the DU of the IAB node #1 904 may perform transmission or reception without considering transmission or reception of the MT of the IAB node #1 904, Specifically, when the time resource of the DU of the IAB node #1 904 is for DL, the DU of the IAB node #1 904 may perform transmission. When the time resource of the DU of the IAB node #1 904 is for UL, the DU of the IAB node #1 904 may perform reception. When the time resource of the DU of the IAB node #1 904 is flexible, the DU of the IAB node #1 904 may perform transmission or reception. In this case, the schedules from the parent IAB nodes that correspond to the transmission or reception direction (i.e., satisfy the haftduplex constraint) of the DU of the IAB node #1 904 may be transmitted or received from the MT of the IAB node #1 904. For example, when the DU of the IAB node #1 904 performs transmission, the MT of the IAB node #1 904 is allowed to perform UL transmission according to an indication from the parent IAB node scheduled for UL. Hence, when the MT of the IAB node #1 904 is scheduled for DL, it may not follow the indication from the parent IAB node and the MT of the IAB node #1 904 is unable to receive DL transmission.

When the resource type of the DU of the IAB node #1 904 is soft, the DU of the IAB node #1 904 may perform transmission or reception when at least one of the following Conditions 1, 2 or 3 is satisfied to meet the half-duplex constraint. Specifically, when the at least one of the following Conditions 1, 2, or 3 is satisfied, the DU of the IAB node #1 904 may perform transmission when the time resource of the DU of the IAB node #1 904 is for DL, the DU of the IAB node #1 904 may perform reception when the time resource of the DU of the IAB node #1 904 is for UL, and the DU of the IAB node #1 904 may perform transmission or reception when the time resource of the DU of the IAB node #1 904 is flexible.

Condition 1 The MT of the IAB node #1 904 does not perform transmission or reception at the same time as transmission or reception by the DU. In other words, Condition 1 occurs when there is no scheduling for transmission or reception from the parent IAB nodes at the same time as transmission or reception by the DU.

Condition 2 As a transmission or reception direction of the DU of the IAB node #1 904 corresponds to the transmission or reception direction of the MT of the IAB node #1 904, the half-duplex constraint may be satisfied, so the transmission or reception direction of the DU of the IAB node #1 904 does not affect the transmission or reception of the MT of the IAB node #1 904. In this case, for example, for a transmission or reception direction of the MT of the IAB node #1 904, the transmission or reception direction scheduled or indicated from a parent IAB node, which is in an MCG, may be considered first, and the transmission or reception direction scheduled or indicated from a parent IAB node, which is in an SCG, may be considered next when there is no scheduling or indication of data transmission or reception from the parent IAB node that is in the MCG.

Condition 3 The MT of the IAB node #1 904 receives an indication that a soft resource is available for the DU of the IAB node #1 904 from at least one parent IAB node.

When the resource type of the DU of the IAB node #1 904 is NA, i.e., unavailable, the DU of the IAB node #1 904 does not perform transmission or reception for half-duplex constraint. In this case, when schedules conflict between parent IAB nodes, the MT of the IAB node #1 904 may prioritize a schedule from a parent IAB node that is in the MCG. Specifically, the MT of the IAB node #1 904 may perform transmission or reception according to the scheduling from the parent IAB node that is in the MCG, and ignore the scheduling from the SCG when the scheduling of a parent IAB node that is in the SCG may not satisfy the half-duplex constraint.

When the DU of the IAB node #1 904 transmits an SS/PBCH block, transmits a physical downlink control channel (PDCCH) for SIB1 transmission, transmits a periodic CSI-RS or receives a physical random access channel (PRACH) or a scheduling request (SR) in the time resource (i.e., a time resource in which transmission or reception of the DU and MT of the IAB node #1 904 may conflict), the IAB node #1 904 may perform a procedure for an occasion when the resource type of the DU of the IAB node #1 904 is hard, regardless of the resource type set for the DU of the IAB node #1 904.

Embodiment 2

Embodiment 2 assumes an occasion when transmission and reception of the DU and MT of the IAB node #1 904 may conflict with each other when following the configuration from the CU, or the indication or scheduling from the parent IAB node #1 902 or the parent IAB node #2 903 connected to the IAB node #1 904 by dual connectivity. In Embodiment 2, based on the direction of the resource of the DU of the IAB node #1 904, a procedure for the IAB node #1 904 may be determined according to whether the DU resource is for UL, is for DL or is flexible. For example, when the resource direction of the DU of the IAB node #1 904 is for DL, the MT of the IAB node #1 904 may receive an indication from a parent IAB node scheduled by UL transmission to satisfy the half-duplex constraint. Accordingly, the MT of the IAB node #1 904 may ignore the scheduling from a parent IAB node that is unable to satisfy the haft-duplex constraint.

Embodiment 3

Embodiment 3 assumes an occasion when transmission or reception of the DU and MT of the IAB node #1 904 may conflict with each other when following the configuration from the CU, or the indication or scheduling from the parent IAB node #1 902 or the parent IAB node #2 903 connected to the IAB node #1 904 by dual connectivity. In Embodiment 3, based on a direction of resource or scheduling from a parent IAB node belonging to an MCG that schedules the MT of the IAB node #1 904, i.e., according to scheduling or resource configuration and indication from the parent IAB node belonging to the MCG, a procedure for the IAB node #1 904 may be determined according to whether the MT resource is for UL, is for DL or is flexible. For example, the MT of the IAB node #1 904 may perform DL reception to satisfy the half-duplex constraint when the direction of a resource indicated or configured by the parent IAB node that is in the MCG that schedules the MT of the IAB node #1 904 is for DL, and may receive data from a parent IAB node that is in the SCG only when the direction of a resource indicated or configured by the parent IAB node that is in the SCG is for DL, in which case the DU of the IAB node #1 904 may perform only UL reception. For example, the MT of the IAB node #1 904 may perform UL transmission to satisfy the half-duplex constraint when the direction of a resource indicated or configured by the parent IAB node that is in the MCG that schedules the MT of the IAB node #1 904 is for UL, and may transmit data from the parent IAB node that is in the SCG only when the direction of a resource indicated or configured by the parent IAB node that is in the SCG is for UL, in which case the DU of the IAB node #1 904 may perform only DL transmission. In other words, the MT of the IAB node #1 904 may ignore the scheduling from the parent IAB node that is in the SCG that is unable to satisfy the half-duplex constraint.

Embodiment 4

Embodiment 4 assumes an occasion when transmission and reception of the MT of the IAB node #1 904 may conflict with each other when following the configuration from the CU, or the indication or scheduling from the parent IAB node #1 902 or the parent IAB node #2 903 connected to the IAB node #1 904 by dual connectivity. In this case, an occasion is assumed when the DU of the IAB node #1 904 does not perform transmission or reception. When schedules received from the parent IAB nodes conflict with each other, the MT of the IAB node #1 904 may prioritize the schedule from the parent IAB node that is in the MCG. Specifically, the MT of the IAB node #1 904 may perform transmission or reception according to the scheduling from the parent IAB node that is in the MCG, and ignore the scheduling from the SCG when the scheduling from a parent IAB node that is in the SCG is unable to satisfy the half-duplex constraint.

Embodiment 5

Embodiment 5 assumes an occasion when transmission and reception of the MT of the IAB node #1 904 may conflict with each other when following the configuration from the CU, or the indication or scheduling from the parent IAB node #1 902 or the parent IAB node #2 903 connected to the IAB node #1 904 by dual connectivity. When schedules received from the parent IAB nodes conflict with each other, the MT of the IAB node #1 904 may prioritize transmission or reception of a channel (or signal) from a particular parent IAB node by taking into account transmission or reception of a channel (or signal) required for communication. The required channel or signal may include an SSB/PBCH, a PDCCH for scheduling an SIB1, a periodic CSI-RS, a PRACH/SR, etc. For example, when SSB/PBCH transmission, SIB1 transmission, or periodic CSI-RS transmission occurs from the parent IAB node #1 902 and the MT of the IAB node #1 904 needs to receive the SSB/PBCH, PDCCH for scheduling SIB1 or periodic CSI-RS or transmit the PRACH/SR to the parent IAB node #1 902 from the MT of the IAB node #1 904, the MT of the IAB node #1 904 may transmit or receive the channel or signal to the parent IAB #1 902 and may not perform the indication or scheduling from the parent IAB node #2 903 with which there was a conflict.

Embodiment 6

Embodiment 6 uses a combination of Embodiment 4 and Embodiment 5. In other words, when schedules received from parent IAB nodes conflict with each other according to Embodiment 4, the MT of the IAB node #1 904 may prioritize the schedule from the parent IAB node that is in the MCG. When transmission or reception of the required channel or signal as in Embodiment 5 occurs in a particular parent IAB node (e.g., the parent IAB node that is in an SCG), scheduling from the particular parent IAB node may be prioritized over the scheduling from a parent IAB node that is in the MCG. For example, when transmission or reception of a general channel or signal from the parent IAB node that is in the MCG conflicts with transmission or reception of a general channel or signal from the parent IAB node that is in the SCG, the MT of the IAB node #1 904 will prioritize the transmission or reception of the channel or signal from the parent IAB node that is in the MCG. The general channel or signal may refer to any channel or signal that is not included in the required channel or signal as described earlier in Embodiment 5.

When transmission or reception of a required channel or signal from the parent IAB node that is in the MCG conflicts with transmission or reception of a general channel or signal from the parent IAB node that is in the SCG, the MT of the IAB node #1 904 will prioritize the transmission or reception of the channel or signal from the parent IAB node that is in the MCG. When transmission or reception of a general channel or signal from the parent IAB node that is in the MCG conflicts with transmission or reception of a required channel or signal from the parent IAB node that is in the SCG, the MT of the IAB node #1 904 will prioritize the transmission or reception of the channel or signal from the parent IAB node that is in the SCG. When transmission or reception of a required channel or signal from the parent IAB node that is in the MCG conflicts with transmission or reception of a required channel or signal from the parent IAB node that is in the SCG, the MT of the IAB node #1 904 will prioritize the transmission or reception of the channel or signal from the parent IAB node that is in the MCG.

Embodiment 7

Embodiment 7 uses a combination of Embodiments 1, 4, and 5 or Embodiments 1 and 6. For example, when the transmission or reception of the DU takes priority according to the resource type of the DU of the IAB node #1 904, transmission or reception from a parent IAB node that follows transmission or reception of the DU and satisfies half-duplex constraint will be prioritized.

When the transmission or reception of the DU is not prioritized or there is no transmission or reception of the DU, Embodiment 6 may be applied instead of Embodiment 7.

This case assumes an occasion when transmission or reception of the DU and MT of the IAB node #1 904 may conflict with each other when following the configuration from the CU, or the indication or scheduling from the parent IAB node #1 902 or the parent IAB node #2 903 connected to the IAB node #1 904 by dual connectivity. A procedure for the IAB node #1 904 may be determined according to whether the resource type of the DU of the IAB node #1 904 is hard, soft or non-available.

When the resource type of the DU of the IAB node #1 904 is hard, the DU of the IAB node #1 904 may perform transmission or reception without considering transmission or reception of the MT of the IAB node #1 904. Specifically, when the time resource of the DU of the IAB node #1 904 is for DL, the DU of the IAB node #1 904 may perform transmission. When the time resource of the DU of the IAB node #1 904 is for UL, the DU of the IAB node #1 904 may perform reception. When the time resource of the DU of the IAB node #1 904 is flexible, the DU of the IAB node #1 904 may perform transmission or reception. In this case, the schedules from the parent IAB nodes that correspond to the transmission or reception direction (i.e., satisfy the haft-duplex constraint) of the DU of the IAB node #1 904 may be transmitted or received from the MT of the IAB node #1 904. For example, when the DU of the IAB node #1 904 performs transmission, the MT of the IAB node #1 904 is allowed to perform UL transmission according to an indication from the parent IAB node scheduled for UL. Hence, when the MT of the IAB node #1 904 is scheduled for DL, it may not follow the indication from the parent IAB node and the MT of the IAB node #1 904 is unable to receive DL transmission.

When the resource type of the DU of the IAB node #1 904 is soft, the DU of the IAB node #1 904 may perform transmission or reception when at least one of the following Conditions 1, 2 or 3 is satisfied to meet the haft-duplex constraint. Specifically, when the at least one of the following Conditions 1, 2, or 3 is satisfied, the DU of the IAB node #1 904 may perform transmission when the time resource of the DU of the IAB node #1 904 is for DL. The DU of the IAB node #1 904 may perform reception when the time resource of the DU of the IAB node #1 904 is for UL. The DU of the IAB node #1 904 may perform transmission or reception when the time resource of the DU of the IAB node #1 904 is flexible.

Condition 1 The MT of the IAB node #1 904 does not perform transmission or reception at the same time as transmission or reception by the DU. In other words, Condition 1 occurs when there is no scheduling for transmission or reception from the parent IAB nodes at the same time as transmission or reception by the DU.

Condition 2 As a transmission or reception direction of the DU of the IAB node #1 904 corresponds to the transmission or reception direction of the MT of the IAB node #1 904, the half-duplex constraint may be satisfied, so the transmission or reception direction of the DU of the IAB node #1 904 does not affect the transmission or reception of the MT of the IAB node #1 904, In this case, for example, for a transmission or reception direction of the MT of the IAB node #1 904, the transmission or reception direction scheduled or indicated from a parent IAB node, which is in an MCG, may be considered first, and the transmission or reception direction scheduled or indicated from a parent IAB node, which is in an SCG, may be considered next when there is no scheduling or indication of data transmission or reception from the parent IAB node that is in the MCG. When transmission or reception of the required channel or signal as in Embodiment 5 occurs in a particular parent IAB node (e.g., the parent IAB node that is in an SCG), scheduling from the particular parent IAB node may be prioritized over the scheduling from the parent IAB node that is in the MCG.

Condition 3 The MT of the IAB node #1 904 receives an indication that a soft resource is available for the DU of the IAB node #1 904 from at least one parent IAB node.

When the resource type of the DU of the IAB node #1 904 is NA, i.e., unavailable, the DU of the IAB node #1 904 does not perform transmission or reception for the half-duplex constraint. In this case, when schedules conflict between parent IAB nodes, the MT of the IAB node #1 904 may prioritize the schedule from the parent IAB node that is in the MCG. Specifically, the MT of the IAB node #1 904 will perform transmission or reception according to the scheduling from the parent IAB node that is in the MCG, and ignore the scheduling from the SCG when the half-duplex constraint may not be satisfied by the parent IAB node that is in the SCG. When transmission or reception of the required channel or signal as in Embodiment 5 occurs in a particular parent IAB node (e.g., the parent IAB node that is in an SCG), scheduling from the particular parent IAB node may be prioritized over the scheduling from the parent IAB node that is in the MCG.

When the DU of the IAB node #1 904 transmits an SS/PBCH block, transmits a PDCCH for SIB1 transmission, transmits a periodic CSI-RS or receives a PRACH or an SR in the time resource (i.e., a time resource in which transmission or reception of the DU and MT of the IAB node #1 904 may conflict), the IAB node #1 904 may perform a procedure for a case that the resource type of the DU of the IAB node #1 904 is hard, regardless of the resource type set for the DU of the IAB node #1 904.

Prioritizing, by the MT of the IAB node #1 904 transmission or reception of a channel or signal from a particular parent IAB node according to the methods in the above embodiments may mean that the MT of the IAB node #1 904 drops transmission or reception of a channel or a signal from the other parent IAB node. Accordingly, the MT of the IAB node #1 904 may report transmission or reception status of the dropped channel or signal to the parent IAB node that has scheduled the transmission or reception of the dropped channel or signal. The report may be transmitted in a physical signal or a higher layer (MAC or RRC signal) signal. It may be possible for the parent IAB node that has scheduled transmission or reception of the dropped channel or signal to reschedule the dropped channel or signal for the MT of the IAB node #1 904 through the report.

One or more of the aforementioned embodiments may be defined in the standards, and which embodiment is to be used by the IAB node #1 904 among the embodiments defined in the standards may be configured by a higher layer signal.

Figure 10:
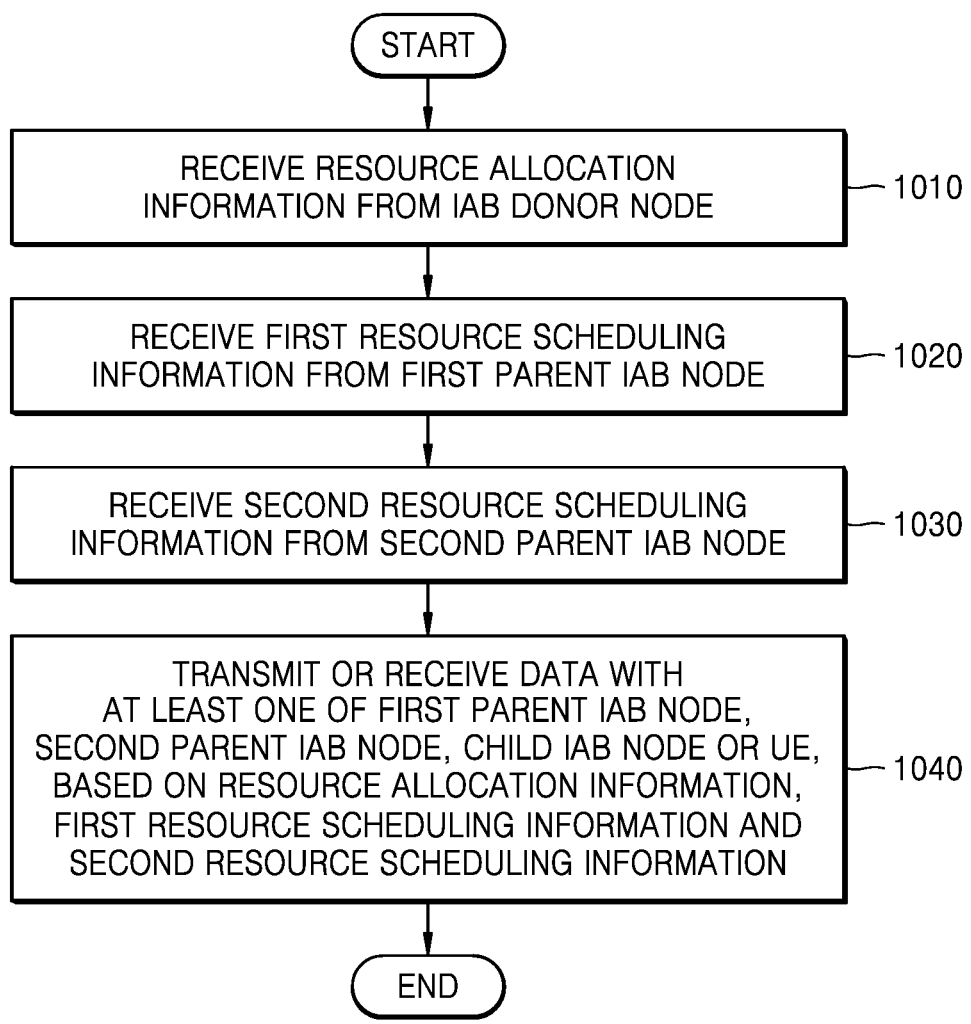
FIG. 10 is a flowchart illustrating a method of transmitting or receiving data by an IAB node, according to an embodiment.

FIG. 10 is a flowchart illustrating a method of transmitting or receiving data by an IAB node, according to an embodiment.

Referring to FIG. 10, in step 1010, an IAB node receives resource allocation information from an IAB donor node. Before receiving the resource allocation information, the IAB node may report a half-duplex or full duplex capability of the MT or the DU of the IAB node to the IAB donor or parent IAB nodes.

In step 1020, the IAB node receives first resource scheduling information from a first parent IAB node.

In step 1030, the IAB node receives second resource scheduling information from a second parent IAB node.

In step 1040, the IAB node transmits or receives data to or from at least one of the first parent IAB node, the second parent IAB node, a child IAB node or a UE (e.g., a UE in a cell) based on the resource allocation information, the first resource scheduling information and the second resource scheduling information.

Figure 11:
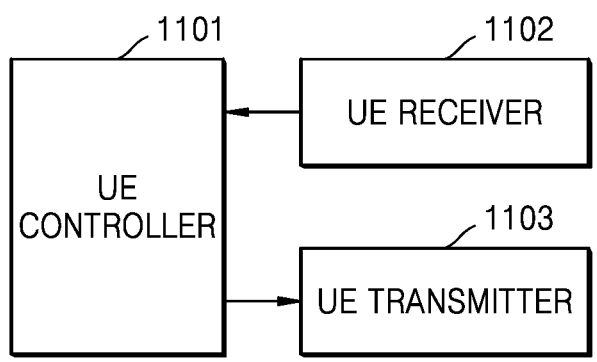
FIG. 11 is a block diagram of a UE, according to an embodiment.
Figure 12:
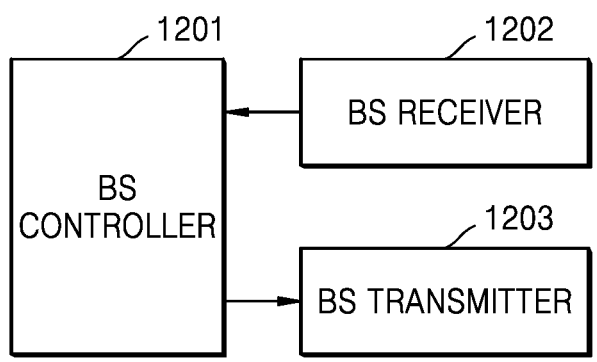
FIG. 12 is a block diagram of a base station (BS), according to an embodiment.
Figure 13:
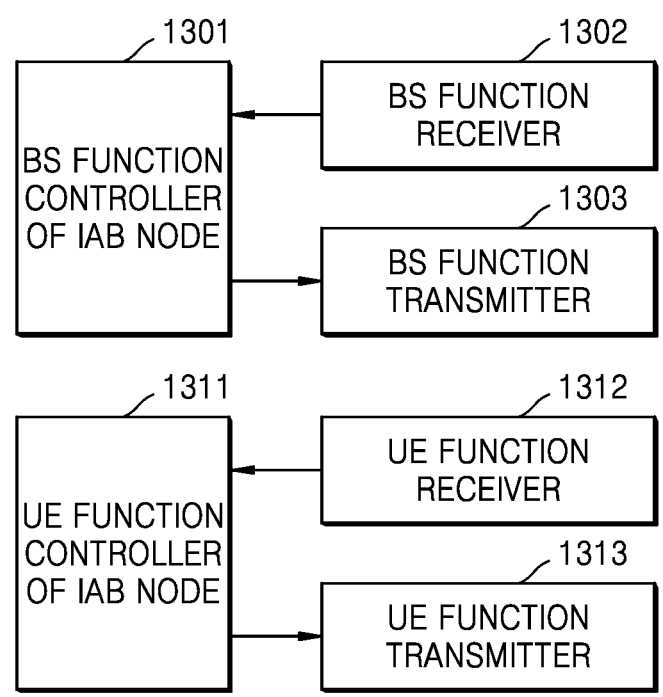
FIG. 13 is a block diagram of an IAB node, according to an embodiment.

FIG. 11 is a block diagram of a UE and FIG. 12 is a block diagram of a BS. FIGS. 11 and 12 show a transmitter, a receiver and a controller of a UE and a BS, respectively. FIG. 13 is a block diagram of an IAB node, according to an embodiment. FIG. 13 shows a device of an IAB node. FIGS. 11 to 13 illustrate devices for performing a transmission or reception method of a BS (a donor BS) that performs backhaul link transmission or reception with an IAB node through mmWave and a transmission or reception method of a UE that performs access link transmission or reception with the IAB node when backhaul link or access link transmission or reception is performed by the IAB node in a 5G communication system.

Referring to FIG. 11, the UE may include a UE controller 1101, a UE receiver 1102 and a UE transmitter 1103. The UE may further include a memory. Components of the UE are not, however, limited to those shown in FIG. 11. For example, the UE may include fewer or a greater number of elements. In addition, the UE controller 1101, the UE receiver 1102, and the UE transmitter 1103 may be implemented in a single chip.

The UE controller 1101 may control a series of processes for the UE to be operated according to the embodiments. For example, the UE controller 1101 may control access link transmission or reception with an IAB node. The UE controller 1101 may control the UE receiver 1102 and the UE transmitter 1103 to receive and transmit information, respectively. The UE controller 1101 may include one or more processors.

The UE receiver 1102 and the UE transmitter 1103 may be collectively called a transceiver. The transceiver may transmit or receive signals to or from a BS. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the UE controller 1101, or transmit a signal output from the UE controller 1101 on a wireless channel.

The memory may store a program and data required for operation of the UE. The memory may store control information or data included in a signal obtained by the UE. The memory may include a storage medium such as a read only memory (ROM), a random access memory (RAM), a hard disk, a compact disc ROM (CD-ROM), and a digital versatile disc (DVD), or a combination of storage mediums. Alternatively, the memory may not be separately present but integrated into the UE controller 1101. The UE controller 1101 may control the components of the UE by executing the program stored in the memory.

Referring to FIG. 12, the BS may include a BS controller 1201, a BS receiver 1202 and a BS transmitter 1203. The BS may further include a memory. Components of the BS are not, however, limited to those shown in FIG. 2. For example, the BS may include fewer or a greater number of elements. In addition, the BS controller 1201, the BS receiver 1202, and the BS transmitter 1203 may be implemented in a single chip.

The BS controller 1201 may control a series of processes for the BS to be operated according to the embodiments. For example, the BS controller 1201 may control backhaul link transmission or reception and access link transmission or reception with an IAB node in different ways. The BS controller 1201 may control the BS receiver 1202 and the BS transmitter 1203 to receive and transmit information, respectively. The BS controller 1201 may include one or more processors.

The BS receiver 1202 and the BS transmitter 1203 may be collectively called a transceiver. The transceiver may transmit or receive signals to or from a UE. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the BS controller 1201, or transmit a signal output from the BS controller 1201 on a wireless channel.

The memory may store a program and data required for an operation of the BS. The memory may store control information or data included in a signal obtained by the BS. The memory may include a storage medium such as a ROM, a RAM, a hard disk, a CD-ROM, and a DVD, or a combination of storage mediums. Alternatively, the memory may not be separately present but integrated into the BS controller 1201. The BS controller 1201 may control the components of the BS by executing the program stored in the memory.

Referring to FIG. 13, the IAB node may include a BS function controller 1301, a BS function receiver 1302 and a BS function transmitter 1303 of the IAB node for performing backhaul link transmission or reception with a lower IAB node. The IAB node may include a UE function controller 1311, a UE function receiver 1312 and a UE function transmitter 1313 of the IAB node to make initial access to a higher IAB node and a donor BS, perform transmission or reception of a higher layer signal before backhaul transmission or reception, and perform backhaul link transmission or reception with the higher IAB node and the donor BS. The IAB node may further include a memory. Components of the IAB node are not, however, limited to those shown in FIG. 13. For example, the IAB node may include fewer or a greater number of components. In addition, each component shown in FIG. 13 may be implemented in the form of a single chip. The BS function controller 1301 of the IAB node and the UE function controller 1311 of the IAB node may each include one or more processors.

The BS function controller 1301 of the IAB node may control a series of processes for the IAB node to be operated according to the aforementioned embodiment and, for example, perform the function of the DU of the IAB node as described above. For example, the BS function controller 1301 may control backhaul link transmission or reception with a lower IAB node and access link transmission or reception with a UE in different ways. The BS function receiver 1302 and the BS function transmitter 1303 may be collectively called a transceiver. The transceiver may transmit or receive signals with the lower IAB node and the UE. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the BS function controller 1301, or transmit a signal output from the BS function controller 1301 on a wireless channel.

The UE function controller 1311 of the IAB node may control a series of processes for the lower IAB node to be operated like a UE for data transmission or reception with a donor BS or a higher IAB node according to the aforementioned embodiment, and for example, perform the function of the MT of the IAB node as described above. For example, the UE function controller 1311 may control backhaul link transmission or reception with the donor BS and a higher IAB node in different ways. The UE function receiver 1312 and the UE function transmitter 1313 may be collectively called a transceiver. The transceiver may transmit or receive a signal to or from the donor BS and the higher IAB node. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the UE function controller 1311, or transmit a signal output from the UE function controller 1311 on a wireless channel.

The memory may store a program and data required for an operation of the IAB node. The memory may store control information or data included in a signal obtained by the IAB node. The memory may include a storage medium such as a ROM, a RAM, a hard disk, a CD-ROM, and a DVD, or a combination of storage mediums. The memory may not be separately provided, but may be integrated in the BS function controller 1301 of the IAB node and/or the UE function controller 1311 of the IAB node. The BS function controller 1301 of the IAB node and the UE function controller 1311 of the IAB node may control components of the IAB node by executing the program stored in the memory.

In the meantime, the BS function controller 1301 of the IAB node and the UE function controller 1311 of the IAB node included in the IAB node may be integrated together to be implemented as an IAB node controller. In this case, the IAB node controller may control functions of both the DU and the MT in the IAB node.

Methods according to the embodiments may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the embodiments described herein.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of then. Each of the memories may be provided in the plural.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments through an external port. An extra storage device in the communication network may access a device that performs the embodiments.

In the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa. Based on the described embodiments, a person of ordinary skill in the art will understand and appreciate that various modifications can be made without departing the scope of the disclosure, Thus, it will be apparent to those of ordinary skill in the art that there may be other modifications based on the disclosure. The embodiments may be operated by being combined with one another if necessary. For example, one or more embodiments may be combined to operate the BS and the UE. The embodiments may be equally applied to other communication systems.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a mobile termination (MT) of an integrated access and backhaul (IAB) node configured with a master cell group (MCG) and a secondary cell group (SCG) in a wireless communication system, the method comprising:
   receiving information about first resource scheduling from a first parent IAB node associated with the MCG;
   receiving information about second resource scheduling from a second parent IAB node associated with the SCG; and
   transmitting or receiving a signal based on at least one of the first resource scheduling or the second resource scheduling
   wherein in case that a physical downlink control channel (PDCCH) scheduling a system information block type 1 (SIB1) from the first parent IAB node associated with the MCG and the second resource scheduling from the second parent IAB node associated with the SCG collide, the PDCCH scheduling the SIB1 from the first parent IAB node associated with the MCG is prioritized over the first signal from the second parent IAB node associated with the SCG,
   wherein in case that the first signal from the first parent IAB node associated with the MCG and the PDCCH scheduling the SIB1 from the second parent IAB node associated with SCG collide, the PDCCH scheduling the SIB1 from the second parent IAB node associated with SCG is prioritized over the first signal from the first parent IAB node associated with the MCG, and
   wherein in case that the PDCCH scheduling the SIB1 from the first parent IAB node associated with the MCG and the PDCCH scheduling the SIB1 from the second parent IAB node associated with the SCG collide, the PDCCH scheduling the SIB1 from the first parent IAB node associated with the MCG is prioritized over the PDCCH scheduling the SIB1 from the second parent IAB node associated with the SCG.

2. The method of claim 1, further comprising:
   determining a priority of the first resource scheduling and the second resource scheduling based on a resource type of a distributed unit (DU) in case that there is a collision between a transmission or reception of the MT of the IAB node and a transmission or reception of the DU of the IAB node according to the first resource scheduling or the second resource scheduling.

3. The method of claim 1, further comprising:
   receiving resource allocation information from an IAB donor node through a backhaul interface,
   wherein the resource allocation information is configured by a core network (CN) for the IAB donor node.

4. The method of claim 1, wherein in case that a synchronization signal block (SSB) or a periodic channel state information reference signal (CSI-RS) from the first parent IAB node associated with the MCG and a second signal, other than the SSB and the periodic CSI-RS, from the second parent IAB node associated with the SCG collide, the SSB or the periodic CSI-RS from the first parent IAB node associated with the MCG is prioritized over the second signal from the second parent IAB node associated with the SCG,
   wherein in case that the second signal from the first parent IAB node associated with the MCG and the SSB or the periodic CSI-RS from the second parent IAB node associated with SCG collide, the SSB or the periodic CSI-RS from the second parent IAB node associated with SCG is prioritized over the second signal from the first parent IAB node associated with the MCG, and
   wherein in case that the SSB or the periodic CSI-RS from the first parent IAB node associated with the MCG and the SSB or the periodic CSI-RS from the second parent IAB node associated with the SCG collide, the SSB or the periodic CSI-RS from the first parent IAB node associated with the MCG is prioritized over the SSB or the periodic CSI-RS from the second parent IAB node associated with the SCG.

5. The method of claim 1, wherein in case that a physical random access channel (PRACH) or a scheduling request (SR) to the first parent IAB node associated with the MCG and a third signal, other than the PRACH and the SR, to the second parent IAB node associated with the SCG collide, the PRACH or the SR to the first parent IAB node associated with the MCG is prioritized over the third signal to the second parent IAB node associated with the SCG,
   wherein in case that the third signal to the first parent IAB node associated with the MCG and the PRACH or the SR to the second parent IAB node associated with SCG collide, the PRACH or the SR to the second parent IAB node associated with SCG is prioritized over the third signal to the first parent IAB node associated with the MCG, and
   wherein in case that the PRACH or the SR to the first parent IAB node associated with the MCG and the PRACH or the SR to the second parent IAB node associated with the SCG collide, the PRACH or the SR to the first parent IAB node associated with the MCG is prioritized over the PRACH or the SR to the second parent IAB node associated with the SCG.

6. The method of claim 1, wherein in case that the first signal from the first parent IAB node associated with the MCG and the first signal from the second parent IAB node associated with the SCG collide, the first signal from the first parent IAB node associated with the MCG is prioritized over the first signal from the second parent IAB node associated with the SCG.

7. An integrated access and backhaul (IAB) node comprising a mobile termination (MT) configured with a master cell group (MCG) and a secondary cell group (SCG) in a wireless communication system, the IAB node comprising:
   a transceiver; and
   a processor connected to the transceiver and configured to:
      receive information about first resource scheduling from a first parent IAB node associated with the MCG,
      receive information about second resource scheduling from a second parent IAB node associated with the SCG, and
      transmit or receive a signal based on at least one of the first resource scheduling or the second resource scheduling, wherein in case that a physical downlink control channel (PDCCH) scheduling a system information block type 1 (SIB1) from the first parent IAB node associated with the MCG and a first signal, other than the PDCCH scheduling the SIB1, from the second parent IAB node associated with the SCG collide, the PDCCH scheduling the SIB1 from the first parent IAB node associated with the MCG is prioritized over the first signal from the second parent IAB node associated with the SCG, wherein in case that the first signal from the first parent IAB node associated with the MCG and the PDCCH scheduling the SIB1 from the second parent IAB node associated with SCG collide, the PDCCH scheduling the SIB1 from the second parent IAB node associated with SCG is prioritized over the first signal from the first parent IAB node associated with the MCG, and wherein in case that the PDCCH scheduling the SIB1 from the first parent IAB node associated with the MCG and the PDCCH scheduling the SIB1 from the second parent IAB node associated with the SCG collide, the PDCCH scheduling the SIB1 from the first parent IAB node associated with the MCG is prioritized over the PDCCH scheduling the SIB1 from the second parent IAB node associated with the SCG.

8. The IAB node of claim 7, wherein the processor is further configured to:
  determine a priority of the first resource scheduling and the second resource scheduling based on a resource type of a distributed unit (DU) in case that there is a collision between a transmission or reception of the MT of the IAB node and a transmission or reception of the DU of the IAB node according to the first resource scheduling or the second resource scheduling.

9. The IAB node of claim 7, wherein the processor is further configured to:
  receive resource allocation information from an IAB donor node through a backhaul interface,
  wherein the resource allocation information is configured by a core network (CN) for the IAB donor node.

10. The IAB node of claim 7, wherein in case that a synchronization signal block (SSB) or a periodic channel state information reference signal (CSI-RS) from the first parent IAB node associated with the MCG and a second signal, other than the SSB and the periodic CSI-RS, from the second parent IAB node associated with the SCG collide, the SSB or the periodic CSI-RS from the first parent IAB node associated with the MCG is prioritized over the second signal from the second parent IAB node associated with the SCG, wherein in case that the second signal from the first parent IAB node associated with the MCG and the SSB or the periodic CSI-RS from the second parent IAB node associated with SCG collide, the SSB or the periodic CSI-RS from the second parent IAB node associated with SCG is prioritized over the second signal from the first parent IAB node associated with the MCG, and wherein in case that the SSB or the periodic CSI-RS from the first parent IAB node associated with the MCG and the SSB or the periodic CSI-RS from the second parent IAB node associated with the SCG collide, the SSB or the periodic CSI-RS from the first parent IAB node associated with the MCG is prioritized over the SSB or the periodic CSI-RS from the second parent IAB node associated with the SCG.

11. The IAB node of claim 7, wherein in case that a physical random access channel (PRACH) or a scheduling request (SR) to the first parent IAB node associated with the MCG and a third signal, other than the PRACH and the SR, to the second parent IAB node associated with the SCG collide, the PRACH or the SR to the first parent IAB node associated with the MCG is prioritized over the third signal to the second parent IAB node associated with the SCG, wherein in case that the third signal to the first parent IAB node associated with the MCG and the PRACH or the SR to the second parent IAB node associated with SCG collide, the PRACH or the SR to the second parent IAB node associated with SCG is prioritized over the third signal to the first parent IAB node associated with the MCG, and wherein in case that the PRACH or the SR to the first parent IAB node associated with the MCG and the PRACH or the SR to the second parent IAB node associated with the SCG collide, the PRACH or the SR to the first parent IAB node associated with the MCG is prioritized over the PRACH or the SR to the second parent IAB node associated with the SCG.

12. The IAB node of claim 7, wherein in case that the first signal from the first parent IAB node associated with the MCG and the first signal from the second parent IAB node associated with the SCG collide, the first signal from the first parent IAB node associated with the MCG is prioritized over the first signal from the second parent IAB node associated with the SCG.

13. A non-transitory computer-readable recording medium having recorded thereon a computer program for performing the method of claim 1.

* * * * *